(12) United States Patent
Yoshida

(10) Patent No.: US 9,493,622 B2
(45) Date of Patent: Nov. 15, 2016

(54) POLYPROPYLENE RESIN FOAMED PARTICLES, POLYPROPYLENE RESIN IN-MOLD FOAM MOLDED ARTICLE, AND METHOD FOR PRODUCING SAME

(71) Applicant: KANEKA CORPORATION, Osaka-shi, Osaka (JP)

(72) Inventor: Toru Yoshida, Settsu (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 14/441,375

(22) PCT Filed: Nov. 25, 2013

(86) PCT No.: PCT/JP2013/081632
§ 371 (c)(1),
(2) Date: May 7, 2015

(87) PCT Pub. No.: WO2014/084165
PCT Pub. Date: Jun. 5, 2014

(65) Prior Publication Data
US 2015/0284526 A1    Oct. 8, 2015

(30) Foreign Application Priority Data

Nov. 27, 2012  (JP) .................. 2012-258858
Nov. 27, 2012  (JP) .................. 2012-258861

(51) Int. Cl.
| | | |
|---|---|---|
| C08J 9/04 | (2006.01) | |
| B65D 25/28 | (2006.01) | |
| C08L 23/14 | (2006.01) | |
| C08J 9/18 | (2006.01) | |
| C08J 9/12 | (2006.01) | |
| C08J 9/232 | (2006.01) | |
| B29C 44/34 | (2006.01) | |
| B29C 44/02 | (2006.01) | |
| B65D 25/30 | (2006.01) | |
| C08J 9/00 | (2006.01) | |
| B29K 23/00 | (2006.01) | |
| B29K 105/04 | (2006.01) | |
| B29L 31/00 | (2006.01) | |

(52) U.S. Cl.
CPC .............. *C08J 9/04* (2013.01); *B29C 44/02* (2013.01); *B29C 44/3453* (2013.01); *B29C 44/3461* (2013.01); *B65D 25/28* (2013.01); *B65D 25/30* (2013.01); *C08J 9/0028* (2013.01); *C08J 9/122* (2013.01); *C08J 9/18* (2013.01); *C08J 9/232* (2013.01); *C08L 23/14* (2013.01); *B29K 2023/12* (2013.01); *B29K 2105/048* (2013.01); *B29L 2031/7162* (2013.01); *C08J 2201/034* (2013.01); *C08J 2203/06* (2013.01); *C08J 2323/14* (2013.01); *Y10T 428/1352* (2015.01); *Y10T 428/1376* (2015.01)

(58) Field of Classification Search
CPC ................ C08J 9/00; C08J 9/04; C08J 9/12; C08J 9/0028; C08J 9/122; B29C 44/02; B65D 25/30; B65D 25/28; Y10T 428/1352; Y10T 428/1376; B29K 2023/14; B29K 2023/12; C08L 23/14
See application file for complete search history.

(56) References Cited

U.S. PATENT DOCUMENTS

| | | |
|---|---|---|
| 6,313,184 B1 | 11/2001 | Sasaki et al. |
| 2009/0223979 A1 | 9/2009 | Matherly et al. |
| 2012/0029101 A1 | 2/2012 | Senda |

FOREIGN PATENT DOCUMENTS

| | | |
|---|---|---|
| JP | 8-259724 A | 10/1996 |
| JP | 10-316791 A | 12/1998 |
| JP | 11-171924 A | 6/1999 |
| JP | 2000-143866 A | 5/2000 |
| JP | 2000-198872 A | 7/2000 |
| JP | 2005-298769 A | 10/2005 |
| JP | 2008-133351 A | 6/2008 |
| JP | 2008-255213 A | 10/2008 |
| JP | 2008-545054 A | 12/2008 |
| JP | 2009-57474 A | 3/2009 |
| JP | 2009-280783 A | 12/2009 |
| JP | 2012-233182 A | 11/2012 |
| JP | 2013-144735 A | 7/2013 |
| WO | 99/28374 A1 | 6/1999 |
| WO | 2004/113442 A1 | 12/2004 |
| WO | 2010/032793 A1 | 3/2010 |
| WO | 2010/113471 A1 | 10/2010 |

OTHER PUBLICATIONS

International Search Report dated Feb. 18, 2014, issued in corresponding application No. PCT/JP2013/081632.

*Primary Examiner* — Walter B Aughenbaugh
(74) *Attorney, Agent, or Firm* — Westerman, Hattori, Daniels & Adrian, LLP

(57) ABSTRACT

Polypropylene resin foamed particles containing a polypropylene random copolymer having a ratio of a Z-average molecular weight Mz to a number average molecular weight Mn, Mz/Mn, of 20 or more and 300 or less, a melt-flow rate of 5 g/10 minutes or more and 20 g/10 minutes or less, a melt strength of 2.5 cN or less, and a flexural modulus of 600 MPa or more and 1600 MPa or less, and preferably having at least two heat quantity areas of fusion can provide an in-mold foam molded article such as a returnable box having a short molding cycle at in-mold foam molding and beautiful surface properties; and are excellent in moldability even if an inner pressure more than the atmospheric pressure is not provided to the particles or the particles are filled in a mold without compressing them with a gas during the in-mold foam molding.

20 Claims, 4 Drawing Sheets

POLYPROPYLENE RESIN FOAMED PARTICLES, POLYPROPYLENE RESIN IN-MOLD FOAM MOLDED ARTICLE, AND METHOD FOR PRODUCING SAME

TECHNICAL FIELD

The present invention relates to polypropylene resin foamed particles, a polypropylene resin in-mold foam molded article (for example, a returnable box, and the like), which is obtained by in-mold foam molding the polypropylene resin foamed particles, and a method for producing the same.

BACKGROUND ART

In-mold foam molded articles obtained using polypropylene resin foamed particles have characteristics, which are advantages of the in-mold foam molded article, of shape arbitrariness, lightness, thermal insulation and so on. In addition, the in-mold foam molded article obtained using the polypropylene resin foamed particles is superior in chemical resistance, heat resistance, and strain recovery ratio after compression to in-mold foam molded articles obtained using polystyrene resin foamed particles, and superior in dimensional accuracy, heat resistance, and compressive strength to in-mold foam molded articles obtained using polyethylene resin foamed particles.

Owing to the characteristics described above, the in-mold foam molded article obtained using the polypropylene resin foamed particles is used in various uses such as automobile interior members, cores for an automobile bumper, insulating materials, shock absorbing packaging materials, and returnable boxes.

For example, Patent Document 1 discloses polypropylene resin pre-foamed particles using, as a base material resin, a polypropylene resin having a specific melt-flow rate, a specific melting point, and a specific flexural modulus and also describes a returnable box obtained from the polypropylene resin pre-foamed particles.

In particular, in the returnable box, when heavy parts such as car parts are conveyed, it is desirable that the rigidity is high, the weight of the box itself is as light as possible, and as many as parts can be conveyed.

Then, a method for producing a returnable box is adopted which uses polypropylene resin foamed particles whose base material resin is a high rigid polypropylene resin having a bending elastic modulus of 1300 MPa or more. During in-mold foam molding of the polypropylene resin foamed particles, a heated steam pressure tends to be increased; as a result, a molding cycle in which the polypropylene resin foamed particles are filled in a mold, the particles are fused with heated steam, the resulting product is cooled, and the obtained in-mold foam molded article is taken out from the mold tends to be long.

It is often to provide a grip structure on the returnable box so that workers easily carry it, and, a returnable box for conveying heavy parts has preferably a grip structure which can be securely grasped by inserting workers' fingers, the structure being not a structure to merely hang workers' fingers (for example, Patent Document 2).

When the grip structure part is obtained by the in-mold foam molding, however, depressions and the like looking like pockmarks are generated around a grip structure part on a molded article surface and surface properties are problematically reduced, because it is difficult to pass heated stream or to cool effectively due to a mold structure.

Polypropylene resin pre-foamed particles having a ratio of a Z-average molecular weight Mz to a number average molecular weight Mn, Mz/Mn, which is an indicator of a molecular weight distribution, of 16 or less are disclosed (for example, Patent Documents 3 and 4). These Patent Documents describe that when polypropylene resin pre-foamed particles having an Mz/Mn ratio of 16 or less are used, the obtained platy molded article, or the obtained molded article having protrusions formed on its surface, have the excellent surface nature, but they do not describe or suggest the molding cycle, or the surface properties of the part around the grip of the returnable box having the grip structure.

On the other hand, methods for producing a polypropylene resin having an Mz/Mn ratio of 20 or more are disclosed (for example, Patent Documents 5 to 9), and the production technique of the polypropylene resin having an Mz/Mn ratio of 20 or more is a known technique. However, even if the polypropylene resin foamed particles are produced merely using the polypropylene resin having an Mz/Mn of 20 or more, a returnable box molded article having a short molding cycle and excellent surface properties cannot be obtained.

Although Patent Document 10 does not disclose the Mz/Mn ratio, discloses a method for producing a polypropylene resin having a polydispersion index, which can be considered to be an indicator of a molecular weight dispersion, of 15 or more, propylene beads obtained from the polypropylene resin, and a foamed package for food which is obtained from the propylene beads. A numerical value of Mz/Mn, obtained from the average molecular weight, however, does not coincide with a numerical value of the polydispersion index, obtained from a storage elastic modulus or loss elastic modulus at melting, and there is no knowledge in which they are theoretically interrelated with each other. In addition, Patent Document 10 does not absolutely describe a molding cycle at the time when the propylene beads are subjected to the in-mold foam molding or the surface properties of an in-mold foam molded article. It is not always right that if any polypropylene resin is used, so long as the polypropylene resin has a polydispersion index of 15 or more, then the molded returnable box article can have the short molding cycle and the excellent surface properties. Patent Document 10 also describes a melt strength of 1.50 cN or more, but if the melt strength is too high, a polypropylene resin foamed particles having a high expansion ratio cannot be obtained, and the surface properties are remarkably reduced in the in-mold foam molding.

CITATION LIST

Patent Literatures

Patent Document 1: JP-A No. 2009-280783
Patent Document 2: U.S. Patent No. 2009/0223979
Patent Document 3: JP-A No. 2008-255213
Patent Document 4: JP-A No. H08-259724
Patent Document 5: JP-A No. 2008-133351
Patent Document 6: International Publication WO 2004/113442
Patent Document 7: JP-A No. H11-171924
Patent Document 8: International Publication WO 2010/032793
Patent Document 9: JP-A No. 2009-057474
Patent Document 10: JP-T No. 2008-545054

SUMMARY OF INVENTION

Technical Problem

The present invention provides polypropylene resin foamed particles having a short molding cycle on in-mold foam molding, and capable of providing an in-mold foam molded article such as a returnable box, which is obtained by in-mold foam molding of the polypropylene resin foamed particles, having a beautiful surface properties. In addition, the present invention provides polypropylene resin foamed particles having excellent moldability, and an in-mold foam molded article such as a returnable box, which can be obtained without any procedure of application of an inner pressure higher than the atmospheric pressure to the polypropylene resin foamed particles, or compression of the particles with gas and then filling of a mold with the compressed particles during the in-mold foam molding; and production methods thereof.

Solution to Problem

In view of the circumstances described above, the present inventor has painstakingly studied. As a result, the inventor has found that polypropylene resin foamed particles whose base material resin is a polypropylene random copolymer which has a ratio of a Z-average molecular weight Mz to a number average molecular weight Mn, Mz/Mn, of 20 or more and 300 or less, preferably 20 or more and 140 or less; a melt-flow rate of 5 g/10 minutes or more and 20 g/10 minutes or less; a melt strength of 2.5 cN or less, preferably 1.5 cN or less; and a flexural modulus of 600 MPa or more and 1600 MPa or less, preferably 1300 MPa or more and 1600 MPa or less can solve the problems described above; and has accomplished the present invention.

The present invention, accordingly, contains the following structure.

[1] Polypropylene resin foamed particles containing, as a base material resin, a polypropylene random copolymer which has a ratio of a Z-average molecular weight Mz to a number average molecular weight Mn, Mz/Mn, of 20 or more and 300 or less; a melt-flow rate of 5 g/10 minutes or more and 20 g/10 minutes or less; a melt strength of 2.5 cN or less; and a flexural modulus of 600 MPa or more and 1600 MPa or less.

[2] The polypropylene resin foamed particles according to [1] described above, wherein the polypropylene random copolymer has an Mz/Mn of 20 or more and 140 or less.

[3] The polypropylene resin foamed particles according to [1] described above, wherein the polypropylene random copolymer has an Mz/Mn of 23 or more and 60 or less.

[4] The polypropylene resin foamed particles according to any of [1] to [3] described above, wherein the polypropylene random copolymer has a melt strength of 1.5 cN or less.

[5] The polypropylene resin foamed particles according to any of [1] to [4] described above, wherein the polypropylene random copolymer has a flexural modulus of 1300 MPa or more and 1600 MPa or less.

[6] The polypropylene resin foamed particles according to any of [1] to [5] described above, wherein the polypropylene random copolymer is a propylene/1-butene random copolymer and/or a propylene/ethylene/1-butene random copolymer.

[7] The polypropylene resin foamed particles according to any of [1] to [6] described above, wherein the polypropylene random copolymer has a melting point of 130° C. or higher and 158° C. or lower.

[8] The polypropylene resin foamed particles according to any of [1] to [7] described above, which has at least two heat quantity areas of fusion in a measurement according to a differential scanning calorimeter method.

[9] The polypropylene resin foamed particles according to [8] described above, which has two heat quantity areas of fusion in a measurement according to the differential scanning calorimeter method, and a ratio of a heat quantity of fusion at a high temperature side Qh calculated from a heat quantity of fusion at a low temperature side Ql and a heat quantity of fusion at a high temperature side Qh, [Qh/(Ql+Qh)]×100(%), of 10% or more and 50% or less.

[10] The polypropylene resin foamed particles according to any of [1] to [9] described above, which contains at least two pigments selected from the group consisting of ultramarine, cyanine pigments, azo pigments, and quinacridone pigments in a content of 0.01% by weight or more and 1.5% by weight or less in 100% by weight of the polypropylene resin foamed particles.

[11] A method for producing polypropylene resin foamed particles containing the steps of: storing the polypropylene resin particles containing a polypropylene random copolymer which has a ratio of a Z-average molecular weight Mz to a number average molecular weight Mn, Mz/Mn, of 20 or more and 300 or less, a melt-flow rate of 5 g/10 minutes or more and 20 g/10 minutes or less, a melt strength of 2.5 cN or less, and a flexural modulus of 600 MPa or more and 1600 MPa or less in a pressure-resistant container together with water and a foaming agent; increasing a temperature and a pressure while dispersion is caused in a stirring condition; and then releasing a dispersion in the pressure-resistant container into a zone having a pressure lower than the inner pressure of the pressure-resistant container to foam the polypropylene resin particles.

[12] The method for producing polypropylene resin foamed particles according to [11] described above, wherein a temperature in the pressure-resistant container at the foaming is adjusted to Tm-10(° C.) or higher and lower than Tf(° C.), wherein Tm is a melting point of the polypropylene resin as the base material resin, and Tf is a fusion end temperature of the polypropylene resin as the base material resin.

[13] A method for producing polypropylene resin foamed particles comprising the steps of: providing an inner pressure into first stage foamed particles, the first-step foamed particles being the polypropylene resin foamed particles produced by the method according to [11] or [12] described above, by impregnating the particles with an inorganic gas; and then bringing the particles into contact with steam whose pressure is adjusted to 0.04 MPa (gauge pressure) or more and 0.25 MPa (gauge pressure) or less, thereby obtaining polypropylene resin foamed particles having an expansion ratio higher than that of the first stage foamed particles.

[14] An in-mold foam molded article containing the polypropylene resin foamed particles according to any of [1] to [10].

[15] The in-mold foam molded article according to [14] described above, which is a returnable box.

[16] The in-mold foam molded article according to [15] described above, which is provided with a grip which can be grasped by inserting workers' fingers on a side wall part of the returnable box.

[17] A method for producing an in-mold foam molded article containing the steps of: filling the polypropylene resin foamed particles according to any of [1] to [10] described above in a mold; and then heating them, thereby performing in-mold foam molding.
[18] The method for producing an in-mold foam molded article according to [17] described above, wherein the polypropylene resin foamed particles are filled in the mold in a state in which the inner pressure thereof is the atmospheric pressure without increasing the inner pressure, and in a state in which not compressed them with a gas, and then they are heated, thereby performing the in-mold foam molding.
[19] The method for producing an in-mold foam molded article according to [17] or [18] described above, wherein the in-mold foam molded article is a returnable box.
[20] The method for producing an in-mold foam molded article according to [19] described above, wherein the returnable box is provided with a grip which can be grasped by inserting workers' fingers on a side wall part thereof.

Advantageous Effects of Invention

The polypropylene resin foamed particles of the present invention have a characteristic in which a molding cycle is short when the in-mold foam molding is performed. In addition, the polypropylene resin in-mold foam molded article obtained by in-mold foam molding the polypropylene resin foamed particles of the present invention has a beautiful molded article surface. For example, even in a case of the in-mold foam molded article which is a returnable box provided with a grip which can be grasped by inserting workers' fingers on the side wall part, the returnable box has a beautiful surface around the grip having the structure into which the workers insert their fingers.

In addition, the polypropylene resin foamed particles of the present invention has the excellent moldability even if an operation in which an inner pressure more than the atmospheric pressure is provided to the polypropylene resin foamed particles, or they are compressed with a gas and then filled in a mold is not performed when they are subjected to the in-mold foam molding.

Furthermore, when the polypropylene resin foamed particles of the present invention are added with at least two specific pigments, polypropylene resin foamed particles having a wide range of mold processing and capable of being easily molded can be obtained.

DESCRIPTION OF EMBODIMENTS

Figure 1:
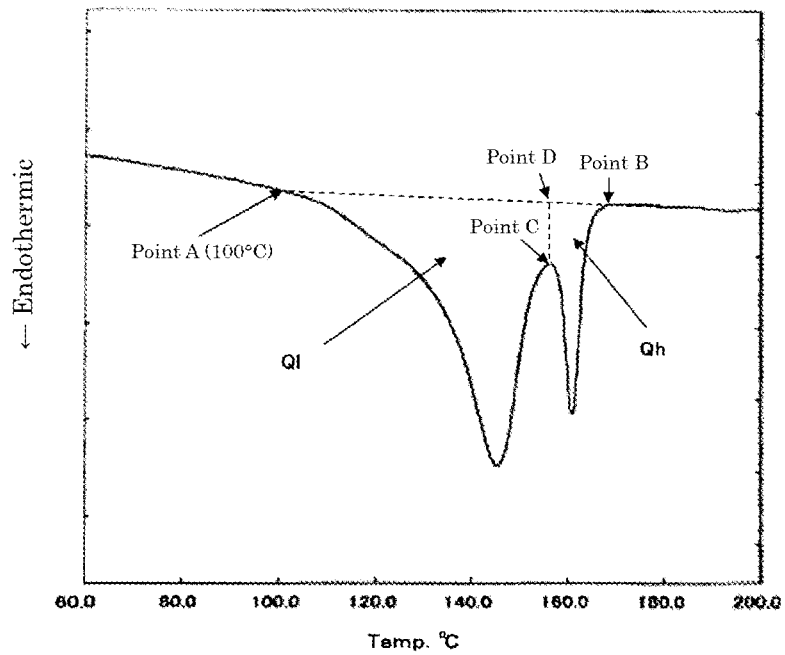
FIG. 1 is one example of DSC curves (temperature vs endothermic amount) obtained by a differential scanning calorimetry (DSC) of polypropylene resin foamed particles used in the present invention, wherein the measurement is performed by elevating a temperature from 40° C. to 220° C. at a temperature elevation rate of 10° C./minute. The DSC curve has two heat quantity areas of fusion which are a heat quantity area of fusion at a low temperature side (heat quantity of fusion at a low temperature side Ql) and a heat quantity area of fusion at a high temperature side (heat quantity of fusion at a high temperature side Qh).

The polypropylene resin used as the base material resin of the polypropylene resin foamed particles of the present invention is a polypropylene random copolymer containing propylene and a comonomer other than propylene. The comonomer may include, for example, α-olefins having 2, or 4 to 12 carbon atoms such as 1-butene, ethylene, isobutene, 1-pentene, 3-methyl-1-butene, 1-hexene, 4-methyl-1-pentene, 3,4-dimethyl-1-butene, 1-heptene, 3-methyl-1-hexene, 1-octene, 1-decene, and the like. The comonomers may be used alone or as a mixture of two or more kinds. Of these, 1-butene and/or ethylene are preferable as the comonomer, because they are excellent in the foamability when the polypropylene resin foamed particles are obtained and excellent in the surface properties when the polypropylene resin in-mold foam molded article is produced, and a polypropylene random copolymer containing both 1-butene and ethylene is more preferable.

The total content of the comonomers in the polypropylene resin in the present invention is preferably 1% by weight or more and 10% by weight or less in 100% by weight of the polypropylene resin. A polypropylene resin having a total content of the comonomers in the polypropylene resin of less than 1% by weight strongly tends to have a melting point of higher than 160° C., and when the obtained foamed particles are subjected to an in-mold foam molding, a molding pressure (steam-heated pressure) reaches more than 0.40 MPa (gauge pressure), and there is sometimes a case where it is difficult to mold them. Even if the in-mold foam molding is performed applying a molding pressure of 0.40 MPa (gauge pressure) or less to the obtained foamed particles, the molding cycle tends to be long. When the comonomer content is more than 10% by weight, though the steam-heated pressure is reduced during the in-mold foam molding, the melting point of the polypropylene resin itself becomes lower, the rigidity is weakened, the molding cycle becomes long, and the practical rigidity such as compression strength tends to be insufficient. When the practical rigidity is insufficient, it is necessary to reduce an expansion ratio of molded article, and in such a case, it is difficult to reduce the weight of the molded article. For those reasons, the comonomer content is more preferably 2% by weight or more and 8% by weight or less and still more preferably 3% by weight or more and 6% by weight or less.

A ratio of a Z-average molecular weight Mz to a number average molecular weight Mn, Mz/Mn, of the polypropylene random copolymer used in the present invention is 20 or more and 300 or less, preferably 20 or more and 140 or less, and more preferably 23 or more and 60 or less. When the Mz/Mn is less than 20, the molding cycle becomes long in the in-mold foam molding, and the surface properties of an in-mold foam molded article such as a returnable box tends to be deteriorated. When the Mz/Mn is more than 300, the molding cycle becomes long, and the surface properties of the in-mold foam molded article such as the returnable box tends to be deteriorated.

The relationship between the value defined by Mz/Mn and the problems to be solved by the present invention is not necessarily clear at the present moment. The present inventor presumes that a component having a high molecular weight in the polypropylene random copolymer greatly contributes to shorten the molding cycle, and, on the other hand, a component having a low molecular weight greatly contributes to the surface properties, and thus the contributions to solve the problems of the present application invention are provided by using Mz which reflects the component having a high molecular weight, and defining Mn which sensitively reflects the component having a low molecular weight.

In the present invention, as Mz and Mn (in terms of polystyrene) of the polypropylene random copolymer, Mz and Mn obtained according to a gel permeation chromatography (GPC) in the following measurement conditions are adopted.

(Measurement Conditions)

Pre-treatment of sample: A product obtained by completely dissolving 30 mg of a sample in 20 mL of o-dichlorobenzene at 145° C., and then filtering the solution through a sintered filter having a pore size of 1.0 μm is used as a sample for analysis.

Measuring apparatus: A gel permeation chromatograph Alliance GPC 2000 (manufactured by Waters Corporation)

Analyzing apparatus: Data processing software Empower Professional (manufactured by Waters Corporation)

Column: TSK gel GMH6-HT, two columns, TSK gel GMH6-HTL two columns (each having an inner diameter of 7.5 mm×length of 300 mm, manufactured by Tosoh Corporation)

Mobile phase: o-dichlorobenzene (containing 0.025% BHT)

Column temperature: 140° C.

Detector: A differential refractometer

Flow rate: 1.0 mL/minute

Sample concentration: 0.15% (W/V)-o-dichlorobenzene

Injection amount: 500 μL

Time interval in sampling: one second

Column calibration: Monodispersed polystyrene (manufactured by Tosoh Corporation)

The polypropylene random copolymer used in the present invention has a melt-flow rate (hereinafter which may sometimes be referred to as "MFR") of preferably 5 g/10 minutes or more and 20 g/10 minutes or less, more preferably 7 g/10 minutes or more and 15 g/10 minutes or less, still more preferably 8 g/10 minutes or more and 12 g/10 minutes or less. When the polypropylene random copolymer has an MFR of less than 5 g/10 minutes, the surface properties of the in-mold foam molded article (returnable box and the like) tend to be deteriorated, and when MFR is more than 20 g/10 minutes, the molding cycle tends to become long. In the measurement of MFR in the present invention, a value is obtained by using an MFR measuring instrument described in JIS-K 7210, in conditions of an orifice with 2.0959±0.005 mmϕ and a length of 8.000±0.025 mm, a load of 2160 g, and a temperature of 230±0.2° C.

The polypropylene random copolymer used in the present invention has a flexural modulus of preferably 600 MPa or more and 1600 MPa or less, more preferably 1300 MPa or more and 1600 MPa or less, and still more preferably 1300 MPa or more and 1500 MPa or less. When the polypropylene random copolymer has a flexural modulus of less than 600 MPa, the in-mold foam molded article, obtained by the in-mold foam molding, has a low rigidity, and thus it tends to be difficult to reduce the weight while the sufficient durability is maintained, and when the flexural modulus is more than 1600 MPa, the molding pressure tends to be increased. In particular, in the case of the returnable box, the flexural modulus is preferably 1300 MPa or more and 1600 MPa or less and more preferably 1300 MPa or more and 1500 MPa or less. The flexural modulus in the present invention is a value measured in accordance with ASTM D 790.

The polypropylene random copolymer used in the present invention has a melt strength (melt tension) of preferably 2.5 cN or less, more preferably 1.5 cN or less, and still more preferably 1.1 cN or less. When the polypropylene random copolymer has a melt strength (melt tension) of more than 2.5 cN, it is difficult to increase an expansion ratio, and thus it tends to be difficult to reduce the weight of the returnable box, obtained by the in-mold foam molding. In particular, in a method for producing polypropylene resin foamed particles, which is one of the methods for producing polypropylene resin foamed particles of the present invention described below, in which polypropylene resin particles are dispersed in an aqueous dispersion medium in a pressure-resistant container, the particles are impregnated with a foaming agent, and then they are released into a low pressure zone, if the melt strength of the polypropylene random copolymer is more than 1.5 cN, it is difficult to increase the expansion ratio, the surface properties of the returnable box, obtained by the in-mold foam molding, tends to be deteriorated, and a range of a pressure for heat-molding tends to be decreased. For those viewpoints, the melt strength is preferably 2.5 cN or less and more preferably 1.5 cN or less. The lower limit of the melt strength is more than 0 cN. The preferable embodiment of the polypropylene random copolymer having a melt strength of 1.5 cN or less may include linear (straight-chain) polypropylene random copolymers.

In the present invention, the melt strength is measured as follows: A strand extruded from a die (orifice), having a diameter of 1 mm, a length of 10 mm, and an inlet angle of 45°, is taken at a speed of 1 m/minute using a capillary rheometer provided with an attachment for measuring a melt tension [Capiro Graph manufactured by Toyo Seiki Seisakusho, Ltd.] in conditions of a resin temperature of 230° C. and a piston falling speed of 10 mm/minute; the strand is stabilized, and then the taking speed is increased at 40 m/minute$^2$. A taking load of a pulley with a load cell at a time when the strand is broken is defined as the melt strength.

When the linear polypropylene random copolymer with no branched structure, which is preferably used in the present invention, is used, there is a case where even if the taking speed is increased up to a limit of a measuring apparatus in the melt strength measurement using the capillary rheometer, the strand is not broken. In such a case, the taking load at the taking speed limit is defined as the melt strength.

The melt strength has an amplitude on the chart, and in the present invention, a median of the amplitude is defined as the melt strength.

The polypropylene random copolymer used in the present invention has a melting point of preferably 130° C. or higher and 158° C. or lower, more preferably 144° C. or higher and 154° C. or lower, and still more preferably 147° C. or higher and 153° C. or lower, in order to attain the low molding pressure while the high rigidity is secured.

The polypropylene random copolymer used in the present invention has been explained above. Such a polypropylene random copolymer can be selected by inquiring it to a polypropylene resin manufacturer or referring to catalogs, and the copolymer can be manufactured or experimentally produced by known technology requesting it to a polypropylene resin manufacturer.

In particular, Patent Documents 5 to 7 and 9 and the like can be used as reference for Mz/Mn. Although many numerical values of the melt strength are not disclosed, the polypropylene random copolymer having the melt strength within the range defined in the present invention is not unique, and if a polypropylene random copolymer is a typical, linear (straight-chain) polypropylene random copolymer, which is not subjected to a cross-linking treatment, then the melt strength is within the range defined in the present invention, and such a copolymer can be easily obtained by inquiring to a polypropylene resin manufacturer.

Another thermoplastic resin capable of mixing and using with the polypropylene resin such as a low density polyethylene, a linear low density polyethylene, polystyrene, polybutene, or an ionomer may be used together with the polypropylene resin used as the base material resin in the present invention within a range in which the properties of the polypropylene resin are not lost.

A hydrophilic compound capable of promoting the increase of an expansion ratio, a foam nucleating agent capable of promoting the formation of cell nuclei in the foaming, a compatibilizing agent, an antistatic agent, a coloring agent, or the like may be added to the polypropylene resin used as the base material resin in the present invention within a range in which the properties of the polypropylene resin are not impaired.

The hydrophilic compound capable of promoting the increase of an expansion ratio may include, for example, water-absorbable organic substances such as glycerin, polyethylene glycol, esters of glycerol fatty acid, melamine, isocyanuric acid, and melamine-isocyanuric acid condensation products; water-soluble inorganic substances such as sodium chloride, calcium chloride, magnesium chloride, borax, calcium borate, zinc borate, anhydrous potassium aluminum sulfate, and anhydrous aluminum ammonium sulfate; aliphatic alcohols having 12 or more and 18 or less carbon atoms such as cetyl alcohol and stearyl alcohol; and the like.

The addition amount of the hydrophilic compound is preferably 0.01% by weight or more and 5% by weight or less and more preferably 0.1% by weight or more and 2% by weight or less in 100% by weight of the polypropylene resin foamed particles. When the addition amount of the hydrophilic compound is less than 0.01% by weight, it tends to be difficult to express the effect of increasing the expansion ratio, and when it is more than 5% by weight, it tends to be difficult to uniformly disperse the hydrophilic compound in the polypropylene resin.

The foam nucleating agent capable of promoting the formation of cell nuclei in the foaming may include, for example, inorganic substances such as talc, calcium carbonate, silica, kaolin, barium sulfate, calcium hydroxide, aluminum hydroxide, aluminum oxide, titanium oxide, and zeolite; metal salts of fatty acid such as calcium stearate and barium stearate; and the like.

The addition amount of the foam nucleating agent is preferably 0.01% by weight or more and 5% by weight or less and more preferably 0.1% by weight or more and 2% by weight or less in 100% by weight of the polypropylene resin foamed particles. When the addition amount of the foam nucleating agent is less than 0.01% by weight, the cell diameter tends to be ununiform, and when it is more than 5% by weight, the cell diameter is too fine, and the in-mold foam moldability tends to be deteriorated.

The coloring agent may include ultramarine, cyanine pigments, azo pigments, quinacridone pigments, perylene red pigments, carbon black, and the like.

In the present invention, when at least two pigments selected from the group consisting of ultramarine, cyanine pigments, azo pigments, and quinacridone pigments are added, the effect of expanding a range of a pressure for heat-molding (range of heated steam pressure) in the in-mold foam molding is exerted, which is a preferable embodiment. It is necessary to select at least two pigments as described above.

In the present invention, the total addition amount of the at least two pigments is preferably 0.01% by weight or more and 1.5% by weight or less in 100% by weight of the polypropylene resin foamed particles. When the total addition amount of the at least two pigments is less than 0.01% by weight, it is difficult to exert the effect of expanding the range of a pressure for heat-molding, and when it is more than 1.5% by weight, it tends to be difficult to improve the effect of expanding the range of a pressure for heat-molding.

In the present invention, the additives such as the hydrophilic compound, the foam nucleating agent, and the coloring agent may be added directly to the polypropylene resin, or a masterbatch resin in which the additives are contained in a thermoplastic resin in a high concentration is previously produced and the masterbatch resin may be added to the polypropylene resin.

The thermoplastic resin, which is used as the masterbatch resin, is preferably a polyolefin resin, more preferably a polypropylene resin, and most preferably a polypropylene resin, which is the same as the polypropylene resin used as the base material resin in the present invention.

When the polypropylene resin foamed particles of the present invention are produced, first the polypropylene resin particles are produced.

The method for producing the polypropylene resin particles may include a method using an extruder. Specifically, for example, the polypropylene resin is previously blended with the hydrophilic compound, the foam nucleating agent, the pigments, and other additives, if necessary, and the resulting blend is thrown into an extruder and melt-kneaded. The blend is extruded from dies, cooled, and shredded with a cutter, whereby particles having a desired shape such as a column, an ellipse, a sphere, a cube, or a rectangular solid can be produced.

A weight of one particle of the polypropylene resin particles is preferably 0.2 mg/particle or more and 10 mg/particle or less and more preferably 0.5 mg/particle or more and 5 mg/particle or less. When the weight of one particle of the polypropylene resin particles is less than 0.2 mg/particle, the handling property tends to be deteriorated, and when it is more than 10 mg/particle, mold-filling property tends to be reduced in the in-mold foam molding.

Using the polypropylene resin particles obtained as above, the polypropylene resin foamed particles of the present invention can be produced.

A preferable embodiment for producing the polypropylene resin foamed particles of the present invention may include for example, a method for producing the polypropylene resin foamed particles in an aqueous dispersion system, in which the polypropylene resin particles are dispersed in an aqueous dispersion medium together with a foaming agent such as carbon dioxide in a pressure-resistant container, the temperature is elevated to a softening temperature or higher of the polypropylene resin particles and the container is pressurized, which is held as it is for a given time, and then a foaming step in which the particles are released into a zone having a pressure lower than the inner pressure of the pressure-resistant container is performed to obtain foamed particles.

Specifically, (1) the pressure-resistant container is filled with the polypropylene resin particles, the aqueous dispersion medium, and, if necessary, the dispersant and the like; the inside of the pressure-resistant container is subjected to vacuum drawing, if necessary; the foaming agent having a pressure of 1 MPa (gauge pressure) or more and 2 MPa (gauge pressure) or less is introduced thereto; and the content is heated to a temperature equal to or higher than a softening temperature of the polypropylene resin. The inner pressure of the pressure-resistant container is elevated to about 2 MPa (gauge pressure) or more and 5 MPa (gauge pressure) or less by the heating. If necessary, the foaming agent is added thereto at a temperature around the foaming temperature to adjust the foaming pressure to a desired value; the temperature is adjusted again; the content is held for a given time; and then the content is released into a zone having a pressure lower than the inner pressure of the pressure-resistant container, whereby polypropylene resin foamed particles can be obtained.

Another preferable embodiment for producing the polypropylene resin foamed particles of the present invention may be performed.

(2) The pressure-resistant container is filled with the polypropylene resin particles, the aqueous dispersion medium, and, if necessary, the dispersant, and the like; the inside of the pressure-resistant container is subjected to vacuum drawing, if necessary; and the foaming agent is introduced thereto while the content is heated to a temperature equal to or higher than the softening temperature of the polypropylene resin.

A more preferable embodiment for producing the polypropylene resin foamed particles of the present invention is as follows:

(3) The pressure-resistant container is filled with the polypropylene resin particles, the aqueous dispersion medium, and, if necessary, the dispersant, and the like; the content is heated to a temperature around the foaming temperature; the foaming agent is introduced further thereto; the temperature is adjusted to a foaming temperature; the content is held for a given time; and the content is released into a zone having a pressure lower than the inner pressure of the pressure-resistant container, whereby polypropylene resin foamed particles can be obtained.

When carbon dioxide, nitrogen, air, or a substance used as the foaming agent is pressed into the container before the release into a low pressure zone, then the inner pressure of the pressure-resistant container is increased, and the pressure releasing speed at the foaming is controlled. Further, when carbon dioxide, nitrogen, air, or a substance used as the foaming agent is introduced into the pressure-resistant container during the release into the low pressure zone to control the pressure, then the expansion ratio can also be adjusted.

The polypropylene resin foamed particles of the present invention preferably has at least two heat quantity areas of fusion in a DSC curve obtained according to a differential scanning calorimetry (DSC) elevating the temperature at a temperature elevation rate of 10° C./minute, as shown in FIG. 1. It is preferable, accordingly, to have at least two heat quantity areas of fusion including a heat quantity of fusion at a low temperature side (Ql) and a heat quantity of fusion at a high temperature side (Qh).

The polypropylene resin foamed particles having at least two heat quantity areas of fusion can be easily obtained by appropriately adjusting the inner temperature of the pressure-resistant container to an appropriate value during the foaming in the method for producing the polypropylene resin foamed particles in the aqueous dispersion system described above.

In usual, the inner temperature of the pressure-resistant container during the foaming is preferably Tm-10 (° C.) or higher, more preferably Tm-10 (° C.) or higher and lower than Tf (° C.), still more preferably Tm-8 (° C.) or higher and lower than Tf (° C.), and particularly preferably Tm-5(° C.) or higher and Tf-2 (° C.) or lower, wherein Tm (° C.) is a melting point of a polypropylene resin, which is the base material resin, and Tf (° C.) is a fusion end temperature.

Figure 2:
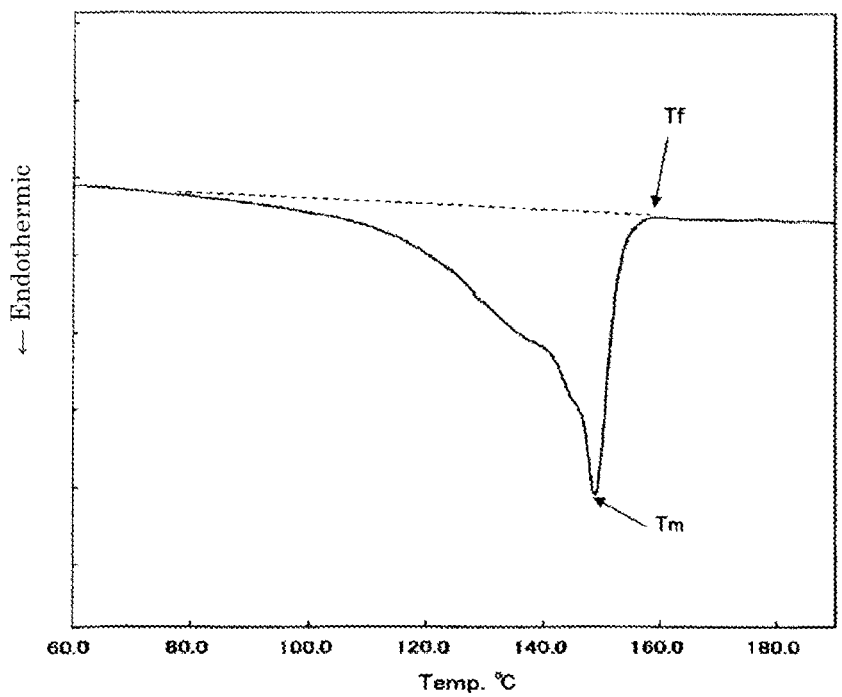
FIG. 2 is one example of DSC curves during a second temperature elevation, obtained by elevating a temperature of a polypropylene resin used in the present invention from 40° C. to 220° C. at a temperature elevation rate of 10° C./minute, then decreasing it from 220° C. to 40° C. at a rate of 10° C./minute, and elevating it again from 40° C. to 220° C. at a rate of 10° C./minute. Tm is a melting point, and Tf is a fusion end temperature which is a temperature at which a bottom of a melt peak at a high temperature side during the second temperature elevation returns a position of a base line at the high temperature side.

Here, the melting point Tm of the polypropylene resin refers to, as shown in FIG. 2, a melt peak temperature during a second temperature elevation on a DSC curve, obtained by elevating a temperature of 1 mg or more and 10 mg or less of the polypropylene resin from 40° C. to 220° C. at a rate of 10° C./minute, then decreasing it from 220° C. to 40° C. at a rate of 10° C./minute, and elevating it again from 40° C. to 220° C. at a rate of 10° C./minute using a differential scanning calorimeter DSC. The fusion end temperature Tf refers to, as shown in FIG. 2, a temperature at which a bottom of a melt peak at a high temperature side during the second temperature elevation returns a position of a base line at the high temperature side.

In the present invention, the total heat quantity of fusion (Q), the heat quantity of fusion at a low temperature side (Ql), and the heat quantity of fusion at a high temperature side (Qh) are defined as follows:

The total heat quantity of fusion (Q=Ql+Qh), which is the sum of the heat quantity of fusion at a low temperature side (Ql) and the heat quantity of fusion at a high temperature side (Qh), is a part surrounded by a line AB and the DSC curve, the line AB being drawn from an endothermic amount (point A) at a temperature of 100° C., at which the melting starts at the low temperature side, to an endothermic amount (point B) at which the melting is finished at the high temperature side, on the obtained DSC curve (see FIG. 1).

When a point at which the endothermic amount between the two heat quantity areas of fusion of the heat quantity of fusion at a low temperature side and the heat quantity of fusion at a high temperature side on the DSC curve is the smallest is defined as point C, and a point at which a line drawn parallel to a Y axis from the point C is intersected with a line AB is defined as D, a part surrounded by a line AD, line CD, and the DSC curve is the heat quantity of fusion at a low temperature side (Ql), and a part surrounded by a line BD, the line CD, and the DSC curve is the heat quantity of fusion at a high temperature side (Qh).

When there are three or more heat quantity areas of fusion, a line is drawn parallel to the Y axis from a point at which the endothermic amount between the heat quantity areas of fusion is the smallest toward the line AB, as described above, and a part surrounded by each line and the DSC curve is defined as a heat quantity of fusion in each area.

When the polypropylene resin foamed particles of the present invention has the two heat quantity areas of fusion, the ratio of the heat quantity of fusion at a high temperature side (Qh), [=[Qh/(Ql+Qh)]×100(%)], (hereinafter which may sometimes be referred to as the "heat quantity of fusion ratio at a high temperature") is preferably 10% or more and 50% or less, more preferably 15% or more and 40% or less, and still more preferably 15% or more and 30% or less. When the heat quantity of fusion ratio at a high temperature is less than 10%, the molded article obtained by the in-mold foam molding tends to have a low compressive strength and a reduced practical strength. When the heat quantity of fusion ratio at a high temperature is more than 50%, though the in-mold foam molded article (the returnable box) has the high compressive strength, the foaming ability of the polypropylene resin foamed particles is too low, and thus the in-mold foam molded article tends to become poor in the fusion as a whole, or the high molding pressure tends to be required for the fusion.

The heat quantity of fusion ratio at a high temperature can be appropriately adjusted, for example, by adjusting the holding time at the inner temperature of the pressure-resistant container (holding time from a time at which the inner temperature of the pressure-resistant container reaches a desired value to a time at which the foaming is started), the foaming temperature (which is a temperature during the foaming, and which is sometimes the same as or is sometimes different from the inner temperature of the pressure-resistant container), the foaming pressure (pressure during the foaming), or the like. In general, when the holding time is prolonged, the foaming temperature is decreased, or the foaming pressure is reduced, then the heat quantity of fusion ratio at a high temperature or the heat quantity of fusion at a high temperature side tends to be increased. From the foregoing, conditions to obtain the desired ratio of the heat quantity of fusion at a high temperature side can be easily found by performing experiments in which the holding time, the foaming temperature, and the foaming pressure are systematically appropriately changed several times. The foaming pressure can be adjusted by adjusting the amount of the foaming agent.

In the present invention, the pressure-resistant container, used for dispersing the polypropylene resin particles, is not particularly limited, any pressure-resistant container may be used so long as it can withstand the inner pressure and inner temperature of the container during the production of the foamed particles, and it may include, for example, an autoclave pressure-resistant container.

It is preferable to use water alone as the aqueous dispersion medium, and a dispersion medium in which methanol, ethanol, ethylene glycol, glycerin, or the like is added to water may also be used. In the present invention, when the hydrophilic compound is contained therein, the water in the aqueous dispersion medium also serves as the foaming agent and contributes to the increase of the expansion ratio.

The foaming agent may include, for example, saturated hydrocarbons such as propane, butane, and pentane; ethers such as dimethyl ether; alcohols such as methanol and ethanol; and inorganic gases such as air, nitrogen, carbon dioxide, and water. Of these, it is desirable to use carbon dioxide or water, because they have a small environmental load and no combustion risk.

In the present invention, it is preferable to use a dispersant or a dispersion auxiliary agent in order to prevent agglomeration of the polypropylene resin particles in the aqueous dispersion medium.

The dispersant may include, for example, inorganic dispersants such as tertiary calcium phosphate, tertiary magnesium phosphate, basic magnesium carbonate, calcium carbonate, barium sulfate, kaolin, talc, and clay. The dispersants may be used alone or as a mixture of two or more kinds.

The dispersion auxiliary agent may include, for example, anionic surfactants such as carboxylate surfactants; sufonate surfactants, e.g., alkyl sulfonates, n-paraffinsulfonates, alkylbenzene sulfonates, alkylnaphthalene sulfonates, sulfosuccinates, and the like; sulfuric ester surfactants of a sulfated oil, an alkyl sulfate, an alkyl ether sulfate, an alkyl aryl ether sulfate, an alkyl amide sulfate, and the like; and phosphoric acid ester surfactants of an alkyl phosphate, a polyoxyethylene phosphate, and the like. The dispersion auxiliary agents may be used alone or as a mixture of two or more kinds thereof.

Of these, it is preferable to use at least one dispersant selected from the group consisting of tertiary calcium phosphate, tertiary magnesium phosphate, barium sulfate, and kaolin together with sodium n-paraffinsulfonate as the dispersion auxiliary agent.

In the present invention, in usual, it is preferable to use the aqueous dispersion medium in an amount of 100 parts by weight or more and 500 parts by weight or less based on 100 parts by weight of the polypropylene resin particles, in order to improve the dispersibility of the polypropylene resin particles in the aqueous dispersion medium.

The amounts of the dispersant and the dispersion auxiliary agent used in the present invention depend on the kind thereof or the kind and the amount of the polypropylene resin particles used, and in general, it is preferable to use the dispersant in an amount of 0.2 parts by weight or more and 3 parts by weight or less and the dispersion auxiliary agent in an amount of 0.001 parts by weight or more and 0.1 parts by weight or less based on 100 parts by weight of the polypropylene resin particles.

In addition to the method for producing the polypropylene resin foamed particles in the aqueous dispersion system as described above, the polypropylene resin foamed particles can also be obtained without using the aqueous dispersion medium; for example, the polypropylene resin particles are directly brought into contact with the foaming agent in the pressure-resistant container to impregnate the particles with the foaming agent, thereby obtaining formable polypropylene resin particles, and then the formable polypropylene resin particles are brought into contact with steam, or the like, to foam them.

The step of obtaining the polypropylene resin foamed particles from the polypropylene resin particles as described above may sometimes be called as a "first stage foaming step," and the thus obtained polypropylene resin foamed particles may sometimes be referred to as "first stage foamed particles."

The first stage foamed particles may have sometimes an expansion ratio of less than 10 times, depending on the kind of the foaming agent in the production, though. In such a case, the first stage foamed particles are impregnated with an inorganic gas (for example, air, nitrogen, carbon dioxide, or the like) to provide an inner pressure to the particles, and then the particles are brought into contact with steam having a specific pressure, whereby polypropylene resin foamed particles having an expansion ratio higher than that of the first stage foamed particles can be obtained. As described above, the step of further foaming the polypropylene resin foamed particles to form polypropylene resin foamed particles having a higher expansion ratio may sometimes be referred to as a "second stage foaming step." The polypropylene resin foamed particles obtained through the second stage foaming step may sometimes be referred to as "second stage foamed particles."

In the present invention, it is preferable to adjust the steam pressure in the second stage foaming step to 0.04 MPa (gauge pressure) or more and 0.25 MPa (gauge pressure) or less and more preferably 0.05 MPa (gauge pressure) or more and 0.15 MPa (gauge pressure) or less, considering the expansion ratio of the second stage foamed particles. When the steam pressure in the second stage foaming step is less than 0.04 MPa (gauge pressure), it tends to be difficult to increase the expansion ratio, and when it is more than 0.25 MPa (gauge pressure), the obtained second stage foamed particles tend to cohere to each other to cause blocking, which cannot be subjected to the subsequent in-mold foam molding.

It is desirable to appropriately change the inner pressure of the air which is introduced into the first stage foamed particles, considering the expansion ratio of the second stage foamed particles and the steam pressure in the second stage foaming step, and the pressure is preferably 0.2 MPa or more (absolute pressure) and 0.6 MPa or less (absolute pressure). When the inner pressure of the air which is introduced into the first stage foamed particles is less than 0.2 MPa (absolute pressure), steam having a high pressure is necessary to increase the expansion ratio, and the second stage foamed particles tend to cause blocking. When the inner pressure of the air which is introduced into the first stage foamed particles is more than 0.6 MPa (absolute pressure), in the second stage foamed particles, interconnected cells tend to be generated, and, in such a case, the rigidity such as the compressive strength of the in-mold foam molded article tends to be reduced.

The polypropylene resin foamed particles of the present invention can be formed into the polypropylene resin in-mold foam molded article by conventionally known in-mold foam molding methods.

For example, the following methods can be utilized as the in-mold foam molding method.

a) A method in which the polypropylene resin foamed particles are subjected to a pressurization treatment with an inorganic gas such as the air, nitrogen, or carbon dioxide, to introduce the inorganic gas into the polypropylene resin foamed particles, whereby a pre-determined inner pressure is provided to the polypropylene resin foamed particles, then the particles are filled in a mold, and the particles are heat-fused with steam.

b) A method in which the polypropylene resin foamed particles are compressed with a gas pressure and filled in a mold, and the particles are heat-fused with steam utilizing a restoring force of the polypropylene resin foamed particles.

c) A method in which the polypropylene resin foamed particles, which are not subjected to a pre-treatment, are filled in a mold, and the particles are heat-fused with steam.

In particular, according to the case of c), the in-mold foam molded article obtained from conventional polypropylene resin foamed particles is remarkably reduced in the surface properties and the dimensionality. However, when the polypropylene resin foamed particles of the present invention are used, the in-mold foam molded article having improved defects described above can be obtained, and thus c) is a preferable embodiment.

Figure 3:
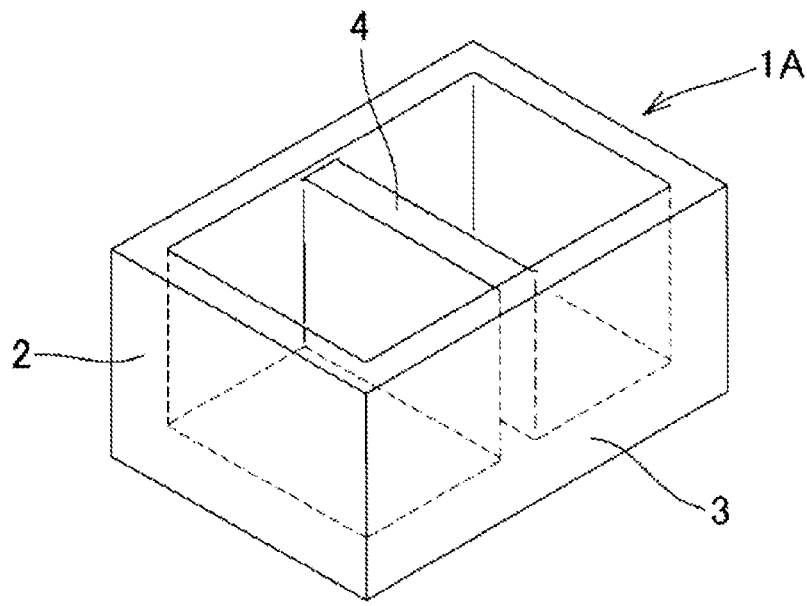
FIG. 3 is a perspective view showing a returnable box which is one embodiment of the in-mold foam molded articles of the present invention.
Figure 4:
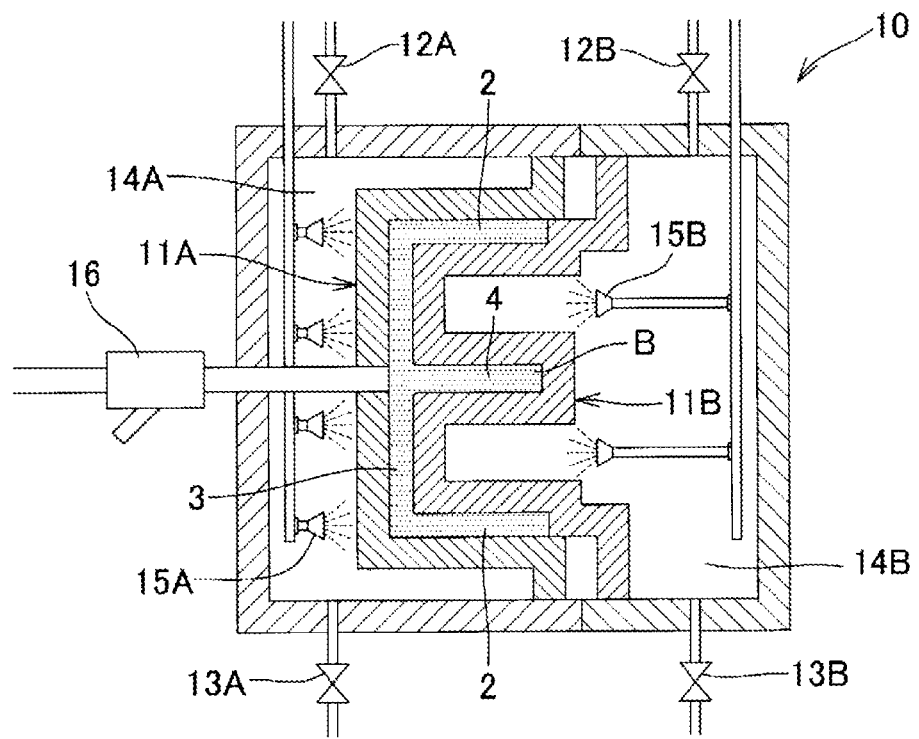
FIG. 4 is a vertical section view showing one example of molds for in-mold foam molding, which is in a state in which, in an in-mold foam molding step of the in-mold foam molded article (the returnable box) shown in FIG. 3, the polypropylene resin foamed particles are filled in a mold containing a fixed die and a movable die through a filling machine.

The method in which the polypropylene resin foamed particles are filled in the mold and the particles are heat-fused with steam may be exemplified, for example, a method using a mold 10 containing a fixed die 11A and a movable die 11B, as shown in FIG. 4, and containing the following steps, when a returnable box 1A having a partition 4 as shown in FIG. 3, is subjected to the in-mold foam molding.

(i) A step in which polypropylene resin foamed particles B are filled in the mold 10 containing the fixed die 11A and the movable die 11B, as shown in FIG. 4, through a filling machine 16 (hereinafter referred to as a "filling step").

(ii) A step in which a steam valve 12A and a drain valve 13A are opened, a steam valve 12B and a drain valve 13B are opened, and steam is run through the steam valves 12A and 12B, whereby the air existing in mold chambers 14A and 14B in the fixed die 11A and the movable die 11B are ejected, and the whole mold 10 is heated (hereinafter referred to as a "pre-heating step").

(iii) A step in which the steam valve 12A and the drain valve 13B are opened, the steam valve 12B and the drain valve 13A are closed, and the steam is run through the steam valve 12A, whereby the air existing among the polypropylene resin foamed particles B filled in the mold 10 is ejected, and heating is performed (hereinafter referred to as a "one-side heating step").

(iv) A step in which, after the step (iii), the steam valve 12B and the drain valve 13A are opened, the steam valve 12A and the drain valve 13B are closed, and the steam is run through the steam valve 12B, whereby the air existing among the polypropylene resin foamed particles B filled in the mold 10 is further ejected, and heating is performed (hereinafter referred to as a "reverse one-side heating step").

(v) A step in which the steam valves 12A and 12B are opened, the drain valves 13A and 13B are closed, and the steam is run through steam valves 12A and 12B, whereby the polypropylene resin foamed particles B are finally fused and bonded to each other by sufficiently elevating the temperature until the surfaces of the polypropylene resin foamed particles B filled in the mold 10 are softened to obtain a polypropylene resin in-mold foam molded article having a given shape (hereinafter referred to as a "both-side heating step").

(vi) A step in which water is sprayed from nozzles of supplying cooling water 15A and 15B (in FIG. 4, all of the nozzles of supplying cooling water are not shown and a part thereof are omitted.) to cool the fixed die 11A and the movable die 11B of the mold 10, then the mold 10 is opened, and the polypropylene resin in-mold foam molded article it taken out therefrom (hereinafter referred to as a "cooling and taking out step").

According to the present application invention, the effect of shortening the molding cycle (time required for performing from the filling step to cooling and taking out step) is exerted compared to a case where the in-mold foam molding is performed using conventional polypropylene resin foamed particles.

In the present invention, the in-mold foam molded article obtained by the in-mold foam molding is not particularly limited, and the in-mold foam molding is performed according to the various uses such as automobile interior members, cores for an automobile bumper, insulating materials, shock absorbing packaging materials, and returnable boxes and the resulting product can be used. It can be more preferably used as the returnable box.

The returnable box in the present invention refers to an in-mold foam molded article having a structure capable of housing an article and usable several times for transporting the article. The returnable box may have a lid or not.

In the present invention, when a returnable box is produced using the polypropylene random copolymer having a flexural modulus of, in particular, 1300 MPa or more and 1600 MPa or less, even if an article having a heavy weight is housed in the box and the box is used several times for the transportation, an effect in which damage received from the article and damage received by colliding with other articles during the transportation are small, because of the high rigidity. As a result, an effect in which the number of repetitive uses is increased compared to the conventional is also exerted. Furthermore, for example, when a returnable box having the same rigidity as that of a conventional box is designed, it is possible to perform the in-mold foam molding using the polypropylene resin foamed particles having a high expansion ratio; as a result, the weight of the returnable box itself can be reduced, and it is possible to increase a weight of an article to be transported to the extent of the reduced weight.

Figure 5:
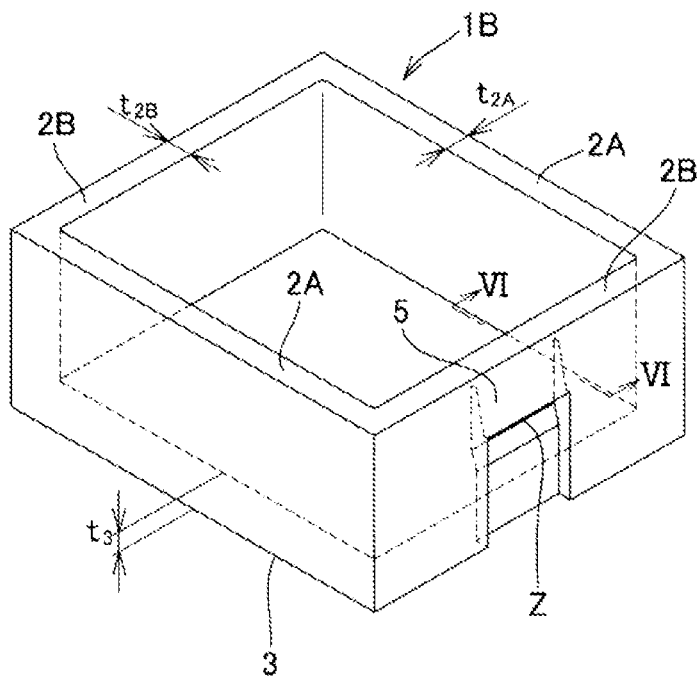
FIG. 5 is a perspective view showing a returnable box having a grip, which is another embodiment of the in-mold foam molded article of the present invention.
Figure 6:
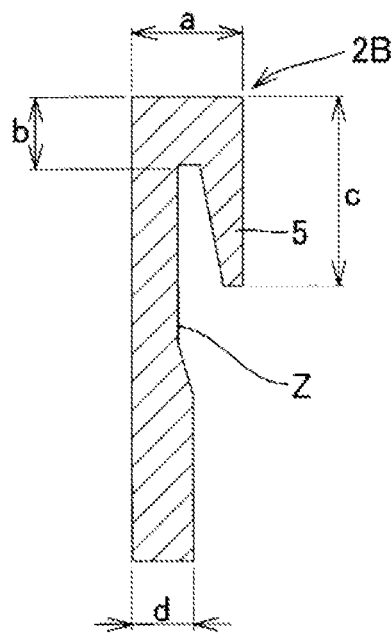
FIG. 6 is a VI-VI cross-sectional view showing a cross-section of a side wall part provided with the grip in the in-mold foam molded article (the returnable box having the grip) in FIG. 5.

The returnable box of the present invention can be provided with a grip 5 which can be grasped by inserting workers' fingers on a side wall 2, or the like, as shown in FIG. 5 and FIG. 6. In such a case, even if an article having a heavy weight is housed, it can be easily carried in a manner in which the workers insert their fingers into the grip 5 and grasp it. Multiple grips 5 can be provided on one returnable box.

Sizes a, b, c, and d of a grip 5 shown in FIG. 6 are not particularly limited, and they are appropriately adjusted depending on the size of a returnable box 1B. The size a, corresponding to a thickness $t_{2B}$ of a side wall 2B on which the grip 5 is provided, is preferably 10 mm or more and 50 mm or less. When a is less than 10 mm, the returnable box 1B tends to be easily broken depending on the weight of an article to be transported, and when it is more than 50 mm, the weight of the returnable box 1B becomes heavy, and thus the workability tends to be reduced.

The size b is preferably 10 mm or more and 100 mm or less. When b is less than 10 mm, the returnable box tends to be easily broken depending on the weight of an article to be transported, and when it is more than 100 mm, the weight of the returnable box becomes heavy, and thus the workability tends to be reduced.

It is enough that the size c is longer than the size b, and it is preferably 15 mm or more and 150 mm or less. When c is less than 15 mm, workers cannot sufficiently insert their fingers into a space between the grip 5 and the side wall 2B, and thus the workability tends to be reduced, and when it is more than 150 mm, the workability is not improved.

The difference between c and b, (c−b), is preferably 10 mm or more. When (c−b) is less than 10 mm, workers cannot sufficiently insert their fingers into a space between the grip 5 and the side wall 2B, and thus the workability tends to be reduced. According to the present application invention, when (c−b) is 10 mm or more, the deterioration of the surface properties of a part around the grip 5, described below, is remarkably improved, and the case is a preferable embodiment.

The size d is preferably 5 mm or more and 50 mm or less. When d is less than 5 mm, the returnable box 1B tends to be easily broken depending on the weight of an article to be transported, and when it is more than 50 mm, the weight of the returnable box 1B becomes heavy, and thus the workability tends to be reduced.

Figure 7:
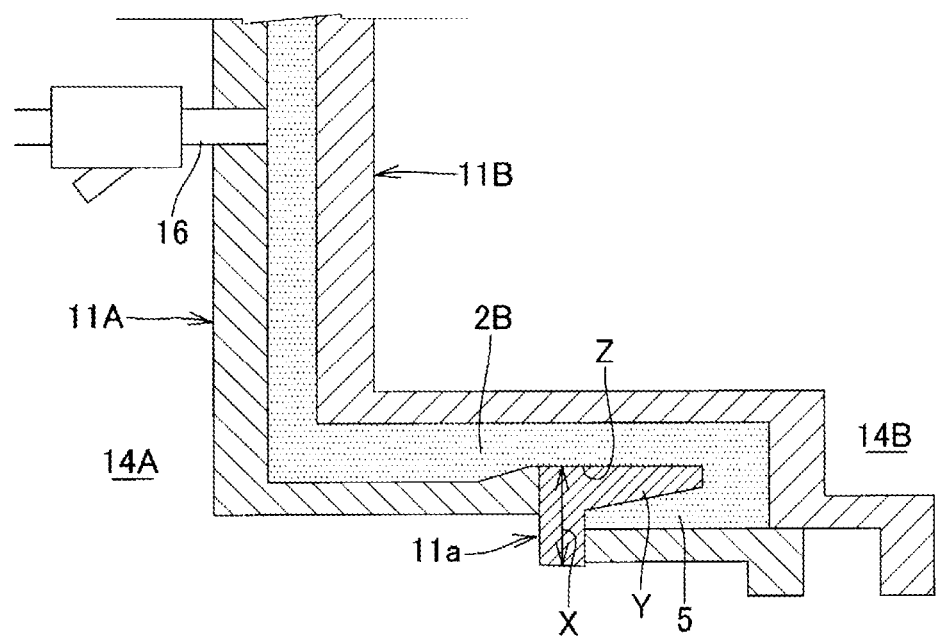
FIG. 7 is a partially enlarged cross-sectional view showing a state in which, in an in-mold foam molding step of the returnable box having the grip shown in FIG. 5, the polypropylene resin foamed particles are filled in a mold containing a fixed die and a movable die through a filling machine.

When such a grip 5 is provided on the returnable box obtained by the in-mold foam molding, depressions looking like pockmarks are generated on a surface Z around the grip 5, and the surface properties are easily deteriorated. There is something unclear about causes of this problem, but the causes are presumed as follows:

When the grip structure part is provided on the returnable box by the in-mold foam molding, for example, a mold structure as shown in FIG. 7 can be taken.

Here, multiple holes through which steam is passed, which are called core vents (not shown in the drawings), for passing the steam from the chamber 14A or 14B side (see FIG. 4) to the filled polypropylene resin foamed particles B side, are made on the mold (the fixed die 11A and movable die 11B) used in the in-mold foam molding.

A part 11a in FIG. 7 is a part in which a grip is formed in the fixed die 11A, and a part X (part shown by a two-way arrow in FIG. 7) is likely to be thickened. As a result, it is presumed that even if the core vents are made, it is difficult to pass the steam in the pre-heating step, the one-side heating step, the reverse one-side heating step, and the both-side heating step, and steam sufficient for fusing and bonding the polypropylene resin foamed particles to each other is not supplied to cause lack of fusion, and thus the surface properties of a part around the grip 5 are deteriorated.

It is also presumed that there is a part Y which is not brought into contact with either the chambers 14A or 14B in the part 11a in which a grip is formed, and it is difficult to pass the steam through the part Y or not to pass the steam through the part Y, or the lack of fusion easily occurs there, thus resulting in occurrence of the deteriorated surface properties around the grip 5.

It is further presumed as follows: In the returnable box 1B, it can be said that the part X which has a thick mold thickness and the part Y which is not brought into contact with either the chambers 14A or 14B are part where it is difficult to be cooled, even if the cooling water is sprayed from the nozzles of supplying cooling water 15A and 15B, in the cooling step. Even if the cooling step is performed in a condition in which the polypropylene resin foamed particles B are sufficiently fused and bonded to each other, effective cooling cannot be performed; as a result, the polypropylene resin foamed particles are shrunk, and the surface properties of the part around the grip (parts shown by sign Z in FIGS. 5 to 7) may sometimes be deteriorated.

The deterioration of the surface properties of the part around the grip markedly occurs when the value (c−b) in FIG. 6 is large and in the shape in which workers can insert their fingers more deeply.

The reasons that the surface properties of the part around the grip are deteriorated are presumed as above, however, when the polypropylene resin foamed particles of the present invention are used, the surface properties of the part around the grip is also improved. In particular, when the polypropylene random copolymer having a flexural modulus of 1300 MPa or more and 1600 MPa or less is used, the improvement of the surface properties of the part around the grip remarkably appears, and such a case is a preferable embodiment.

The part 11a in which the grip is formed in the fixed die 11A used for the production of the returnable box may be integrated with another part of the fixed die, or the part 11a in which the grip is formed may have a structure detachable with another part of the fixed die. In addition, the part 11a in which the grip is formed may be formed of the movable die 11B.

The grip 5 in the present invention is a part formed by the in-mold foam molding, and, for example, grips formed by a secondary processing, such as a process in which after a returnable box having no grip 5 is formed by the in-mold foam molding, a hole is formed by punching a part of a side wall 2, are excluded from the grip in the present invention.

Articles which are transported by the returnable box of the present invention are not particularly limited, and industrial products such as automobile parts, precision machinery components and glass substrates, food and beverage such as packed lunches, daily dishes, canned food, alcoholic drinks, and soft drinks, agricultural products such as vegetables and fruits, marine products such as fish and crustaceans, and various other distributed products can be transported.

The returnable box of the present invention may be provided with a partition, a rib, grooves, or protrusions and depressions in the inside thereof depending on the article to be transported. In addition, known technique can be appropriately applied to the returnable box of the present invention, for example, the returnable box is provided with a notch on a side surface or bottom surface thereof so that the returnable boxes are easily stacked, or the thickness of the side wall 2 or the bottom wall 3 thereof is partially changed in order to increase the strength of the grip part and the like.

EXAMPLES

The present invention is more specifically explained, referring to Examples and Comparative Examples, but the present invention is not limited to those Examples alone.

Substances used in Examples and Comparative Examples are listed below, and they were not particularly purified.

Polypropylene Resin: Polypropylene random copolymers shown in Table 1 and Table 2 [trial products of a polypropylene resin by a manufacturer]

Polyethylene Glycol: manufactured by Lion Corporation, an average molecular weight of 300

Talc: Talcan Powder PK-S manufactured by Hayasi Kasei Co., Ltd.

Ultramarine: Ultramarine manufactured by Daiichi Kasei Co., Ltd.

Cyanine Pigment: A copper phthalocyanine (phthalocyanine blue) reagent manufacture by Wako Pure Chemical Industries, Ltd.

Evaluations in Examples and Comparative Examples were performed as follows:

(Quantification of Polypropylene Resin Copolymer Composition)

To a polypropylene resin (about 1 g) was added 50 g of xylene, and the mixture was heat-dissolved at 120° C. Using a constant temperature centrifuge [H 175 manufactured by Kokusan Co., Ltd.], the mixture was separated at 12000 rpm for 30 minutes into an insoluble component and a soluble component. The obtained soluble component was cooled, and then it was subjected to centrifugation (at 12000 rpm for 30 minutes) to obtain an insoluble component.

To 50 mg of the obtained insoluble component was added 0.4 g of ortho-dichlorobenzene-$d_4$, the mixture was heat dissolved at 100° C., and it was subjected to $^{13}$C-MNR at 98° C. using $^{13}$C NMR [NOVA AS 600 manufactured by Varian] to quantify a copolymerization composition of 1-butene and ethylene.

(Mz/Mn, MFR, and Melt Strength of Polypropylene Resin)

Measurements were performed according to the methods described above.

(Flexural Modulus of Polypropylene Resin)

After a polypropylene resin was dried at 80° C. for 6 hours, using a 35 t injection molding machine, a bar (width: 12 mm and length: 127 mm) having a thickness of 6.4 mm was produced at a cylinder temperature of 200° C. and a mold temperature of 30° C. The obtained bar was conditioned at a temperature of 23° C. in a relative humidity of 50% for 48 hours, and then a bending test was performed in accordance with ASTM D 790 to obtain a flexural modulus.

(Measurement of Melting Point Tm of Polypropylene Resin)

Using a differential scanning calorimeter DSC [DSC 6200 manufactured by Seiko Instruments Inc.], 5 to 6 mg of a polypropylene resin was heated from 40° C. to 220° C. at a temperature elevation rate of 10° C./minute to melt the resin particles, then it was cooled from 220° C. to 40° C. at a temperature falling rate of 10° C./minute to crystallize it, and the crystals were heated again from 40° C. to 220° C. at a temperature elevation rate of 10° C./minute, thereby obtaining a DSC curve (see FIG. 2). From the obtained DSC curve, a value obtained as a melt peak temperature in the second temperature elevation was defined as a melting point Tm.

(Expansion Ratio of Polypropylene Resin Foamed Particles)

After about 3 g or more and 10 g or less of the obtained polypropylene resin foamed particles were collected and dried at 60° C. for 6 hours, they were conditioned in a room having a temperature of 23° C. and a humidity of 50%, and then a weight w (g) thereof was measured. After that, a volume v (cm$^3$) thereof was measured according to an immersion method and an absolute specific gravity $\rho b = w/v$ of the foamed particles was obtained. Further, an expansion ratio $K = \rho r/\rho b$ was obtained from a ratio of a density $\rho r$ of the polypropylene resin particles before foaming thereto.

In Examples and Comparative Examples shown below, a density $\rho r$ of the polypropylene resin particles before foaming is 0.90 g/cm$^3$ in any case.

(Calculation of Ratio of Heat Quantity of Fusion at High Temperature Side of Polypropylene Resin Foamed Particles)

Using a differential scanning calorimeter DSC [DSC 6200 manufactured by Seiko Instruments Inc.], 5 to 6 mg of polypropylene resin foamed particles were heated from 40° C. to 220° C. at a temperature elevation rate of 10° C./minute to obtain a DSC curve (see FIG. 1). In the DSC curve, a total heat quantity of fusion (Q), a heat quantity of fusion at a low temperature side (Ql), and a heat quantity of fusion at a high temperature side (Qh) were defined as below, and a ratio of a heat quantity of fusion at a high temperature side (Qh) [=[Qh/(Ql+Qh)]×100(%)] was calculated.

The total heat quantity of fusion (Q=Ql+Qh), which is the sum of the heat quantity of fusion at a low temperature side (Ql) and the heat quantity of fusion at a high temperature side (Qh), is a part surrounded by a line AB and the DSC curve, the line AB being drawn from an endothermic amount (point A) at a temperature of 100° C., at which the melting starts at the low temperature side, to an endothermic amount (point B) at which the melting is finished at the high temperature side, on the obtained DSC curve.

When a point at which the endothermic amount between the two heat quantity areas of fusion of the heat quantity of fusion at a low temperature side and the heat quantity of fusion at a high temperature side on the DSC curve is the smallest is defined as a point C, and a point at which a line drawn parallel to a Y axis from the point C is intersected with a line AB is defined as D, then a part surrounded by a line AD, line CD, and the DSC curve is the heat quantity of fusion at a low temperature side (Ql), and a part surrounded by a line BD, the line CD, and the DSC curve is the heat quantity of fusion at a high temperature side (Qh).

(Evaluation of Lowest Heated Steam Pressure for Molding, Range of Pressure for Heat-Molding, and Molding Cycle)

A returnable box 1B having grips 5 on a pair of side walls 2B facing each other, as shown in FIG. 5, was evaluated using a polypropylene foam molding machine [P-150N manufactured by Toyo Machinery & Metal Co., Ltd.] on which a mold containing a formable fixed die and a formable movable die was mounted, as described below.

<Mold for Returnable Box Molded Article>

The returnable box molded article had a shape with a grip as shown in FIG. 5, and had external dimensions of a length of 300 mm×a width of 350 mm×a height of 180 mm. A bottom wall 3 had a thickness $t_3$ of 35 mm, which was uniform; two side walls 2A having external dimensions of a width of 350 mm×a height of 180 mm had a thickness $t_{2A}$ of 30 mm, which was uniform; and two side walls 2B having external dimensions of a length of 300 mm×a height of 180 mm had a thickness $t_{2B}$ of 35 mm except for a grip part. The grip 5 part had a cross-sectional shape as shown in FIG. 6 wherein a is 35 mm, b is 35 mm, c is 80 mm, and d is 15 mm.

<Production of Returnable Box Molded Article>

Polypropylene resin foamed particles, which were impregnated with pressurized air to previously adjust the inner pressure thereof to 0.2 MPa (absolute pressure), in a pressure-resistant container, or polypropylene resin foamed particles, which were not provided with an inner pressure and whose inner pressure was the same as the atmospheric pressure, were filled in a mold for a returnable box, and the air in the mold was first ejected with 0.1 MPa (gauge pressure) of steam, and then heat-molding (both-sides heating) was performed for 10 seconds using heated steam having a pre-determined molding pressure, whereby a returnable box molded article was obtained. At that time, firstly the returnable box molded article was obtained by setting the molding pressure during the both-side heating at 0.20 MPa (gauge pressure). Then, by increasing the molding pressure every 0.01 MPa, the returnable box molded articles were obtained.

The filling step of the foamed particles, the molding step, and the cooling and taking out step were as follows:
(1) The mold was opened, (2) the mold was closed until a mold gap in a mold-opening and closing direction reached 8 mm, and then (3) polypropylene resin foamed particles were filled in the mold without flowing thereof to outside of the mold. Subsequently, (4) the mold was closed so that the mold gap was 0 mm thereby compressing the polypropylene resin foamed particles, (5) a pre-heating step, a one-side heating step, a reverse one-side heating step, and a both-side heating step were performed, (6) cooling with water was performed, and (7) a molded article was taken out at a time when a foaming pressure of the molded article in the mold reached 0.05 MPa (gauge pressure).

Here, a series of molding steps (1) to (7) were automatically performed, and the times required for the steps other than the step (6) were made constant. The times required for the pre-heating step, the one-side heating step, the reverse one-side heating step, and the both-side heating step were made 10 seconds, 2 seconds, 2 seconds, and 10 seconds, respectively.

A surface pressure meter was fitted to a part brought into contact with the molded article on the inside surface of the mold, and a pressure that the molded article applied to the surface pressure meter was detected as a foaming pressure for the molded article in the mold.

<Evaluation of Moldability>

A side wall 2A of the obtained foam molded article on which the grip was not provided was torn with hands, the broken surface was visually observed, and a percentage of a part where the insides of the foamed particles, not an interface between the foamed particles, were broken was obtained. A And a surface appearance of a part of the side wall 2A where the grip was not provided was visually observed. Then, foam molded articles having a surface appearance of providing few wrinkles or particle spaces (spaces between the polypropylene resin foamed particles), unremarkable surface unevenness, and beauty, wherein a percentage of the foamed particles having the internal breakage was 60 or more, were decided based on the above. Among them, foam molded articles molded by the smallest molding pressure and the largest molding pressure were decided. The smallest molding pressure was defined as the "lowest heated steam pressure for molding (MPa)" and a difference between the largest molding pressure and the smallest molding pressure was defined as a "range of a pressure for heat-molding (MPa)."

In addition, the times required for the steps (1) to (7) were measured in each molding, and the time required at the lowest heated steam pressure for molding was defined as a "molding cycle (second)."

<Evaluations of Returnable Box Molded Article>

(Compressive Strength)

A test piece having a length of 50 mm×a width of 50 mm×a thickness of 25 mm was cut from the almost center of a bottom surface (thickness: 35 mm) of a returnable box molded article obtained in molding conditions of the lowest heated steam pressure for molding. In more detail, 5 mm-thick surface layers were cut from the both surface layers of the bottom surface having a thickness of 35 mm to obtain the test piece having a thickness of 25 mm.

The test piece was compressed at a rate of 10 mm/minute using a tensile compression tester [TG series manufactured by Minebea Co., Ltd.] in accordance with NDZ-Z 0504, and a compressive stress at 50% compression was measured.

The compressive stress at 50% compression is an indicator of the rigidity of the returnable box molded article.

(Density of Molded Article)

A weight W (g) of a test piece for measurement of a compressive strength was measured, a length, a width, and a thickness of the test piece were measured with a vernier caliper to calculate a volume V (cm$^3$), and a density W/V of a molded article was obtained.

The unit was converted to g/L.

(Surface Properties of Part Around Grip)

The surface properties of a surface Z around the grip shown in FIGS. 5 and 6 of a returnable box molded article obtained in molding conditions of the lowest heated steam pressure for molding were evaluated according to the following criteria:

◯: There were few particle spaces (spaces between the polypropylene resin foamed particles), the surface unevenness was not conspicuous, and the surface was beautiful.

Δ: The particle spaces and the surface unevenness were slightly conspicuous.
×: The particle spaces were conspicuous, and the appearance was clearly poor.

Example 1

[Production of Polypropylene Resin Particles]

To 100 parts by weight of a polypropylene resin (polypropylene random copolymer) containing comonomers whose amount and kind were described in Table 1 and having an Mz/Mn, an MFR, a flexural modulus, a melt strength, and a melting point described in Table 1 were added 0.5 parts by weight of polyethylene glycol as a hydrophilic compound and 0.2 parts by weight of talc as a foam nucleating agent, and they were mixed. The obtained mixture was melt-kneaded at a resin temperature of 220° C. using a twin-screw extruder [TEK 45 manufactured by O.N. MACHINERY Co., Ltd.]. The extruded strands were cooled with water and cut to produce polypropylene resin particles (1.2 mg/particle).

[Production of First Stage Foamed Particles]

In a pressure-resistant container having an inner volume of 10 L were filled with 100 parts by weight of the obtained polypropylene resin particles, 300 parts by weight of water, 1.5 parts by weight of a powdery basic tertiary calcium phosphate as a dispersant, 0.06 parts by weight of sodium n-paraffinsulfonate as a dispersion auxiliary agent, and 7.5 parts by weight of carbon dioxide as a foaming agent. The mixture was heated to a foaming temperature shown in Table 1 while it was stirred, the mixture was held for 10 minutes, carbon dioxide was additionally pressed into the container to adjust the foaming pressure to a value shown in Table 1, and the mixture was held for 30 minutes.

After that, while the inner temperature and pressure of the container were constantly held by pressing the carbon dioxide into the container, a valve under the pressure-resistant container was opened to release the aqueous dispersion medium into a circumstance having the atmospheric pressure through an orifice plate having a through-hole diameter of 3.6 mmϕ, whereby polypropylene resin foamed particles (first stage foamed particles) were obtained.

An expansion ratio, and a ratio of heat quantity of fusion at a high temperature side (heat quantity of fusion ratio at a high temperature) of the obtained first stage foamed particles were calculated.

[Production of In-Mold Foam Molded Article]

A returnable box molded article was produced according to "Production of Returnable Box Molded Article" described above. The lowest heated steam pressure for molding, the range of a pressure for heat-molding, and the molding cycle were evaluated according to "Evaluation of Moldability."

In addition, the returnable box molded article obtained in conditions of the lowest heated steam pressure for molding was dried at 75° C. for 16 hours and aged at 23° C. for 24 hours. The density of the molded article, the measurement of the compressive strength, and the surface properties of the part around the grip thereof were evaluated according to "Evaluation of Returnable Box Molded Article."

Examples 2 to 9

Polypropylene resin particles, polypropylene resin foamed particles, and a returnable box molded article were produced and evaluated in the same manner as in Example 1 except that a polypropylene random copolymer described in Table 1 was used and the additive, foaming conditions, and in-mold foaming conditions were changed to those described in Table 1.

Example 10

First stage foaming was performed in the same manner as in Example 1, using a polypropylene random copolymer described in Table 1, and additives, foaming conditions, and the like described in Table 1 to obtain first stage foamed particles.

Then, after the first stage foamed particles were dried at 80° C. for 6 hours, the particles were impregnated with pressurized air in a pressure-resistant container, thereby adjusting the inner pressure to 0.35 MPa (absolute pressure), and then second foaming was performed by contact with 0.08 MPa (gauge pressure) of steam.

The obtained second stage foamed particles were subjected to in-mold foam molding in the same manner as in Example 1 in in-mold foaming conditions described in Table 1, and the evaluations were made.

Examples 11 and 12

Polypropylene resin particles, polypropylene resin foamed particles, and a returnable box molded article were produced and evaluated in the same manner as in Example 1, except that a polypropylene random copolymer containing no 1-butene described in Table 1 was used, and the additives, foaming conditions, and in-mold foaming conditions were changed to those described in Table 1.

Example 13

Polypropylene resin particles and polypropylene resin foamed particles were obtained in the same manner as in Example 1, except that a polypropylene random copolymer described in Table 1 was used and the additives, foaming conditions, and in-mold foaming conditions were changed to those described in Table 1.

Then, molding was performed and evaluations were made in the same manner as in Example 1, except that the in-mold foam molding was performed in a manner in which the first stage foamed particles whose inner pressure was the same as the atmospheric pressure, without providing an inner pressure thereto, were filled in the mold in [Production of In-Mold Foam Molded Article].

Example 14

After 100 parts by weight of the polypropylene random copolymer used in Example 2 and 0.02 parts by weight of t-butyl peroxy-isopropyl monocarbonate (Perbutyl I manufactured by NOF Corporation), which was a radical initiator, were mixed by stirring in a ribbon blender, the mixture was supplied to a twin-screw extruder (TEX 44 manufactured by The Japan Steel Works, Ltd.) through a metering feeder, and isoprene was supplied from a middle part of the extruder in an amount of 1.0 part by weight based on 100 parts by weight of the starting material polypropylene using a liquid-adding pump. The mixture was melt-kneaded to obtain a modified polypropylene resin.

The obtained modified polypropylene resin had an Mz/Mn of 35, an MFR of 8 g/10 minutes, a flexural modulus of 1400 MPa, a melt strength of 1.6 cN, and a melting point of 147° C.

Polypropylene resin particles, polypropylene resin foamed particles, and a returnable box molded article were produced and evaluated in the same manner as in Example 1, except that the modified polypropylene resin as above was used, and additives described in Table 1 were added and mixed.

Evaluation results in Examples 1 to 14 are shown in Table 1.

TABLE 1

| | | | | | Example 1 | Example 2 | Example 3 | Example 4 | Example 5 | Example 6 | Example 7 | Example 8 |
|---|---|---|---|---|---|---|---|---|---|---|---|---|
| Resin particles | Polypropylene random copolymer | Comonomer | Content of 1-butene | % by weight | 4.3 | 3.4 | 5.6 | 3.4 | 3.2 | 3.4 | 3.4 | 3.4 |
| | | | Content of ethylene | % by weight | 0.5 | 1.1 | 1.0 | 1.1 | 0.9 | 1.1 | 1.1 | 1.1 |
| | | Mz/Mn | | — | 25 | 40 | 63 | 82 | 138 | 40 | 40 | 40 |
| | | MFR | | g/10 minutes | 10 | 9 | 15 | 5 | 8 | 9 | 9 | 9 |
| | | Bending elastic modulus | | MPa | 1440 | 1400 | 1500 | 1400 | 1450 | 1400 | 1400 | 1400 |
| | | Melt strength | | cN | 0.1 | 0.1 | 0.1 | 0.6 | 0.6 | 0.1 | 0.1 | 0.1 |
| | | Melting point Tm | | °C. | 148 | 147 | 149 | 147 | 148 | 147 | 147 | 147 |
| | Additive | Polyethylene glycol | | parts by weight | 0.5 | 0.5 | 0.5 | 0.5 | 0.5 | 0.5 | 0.5 | 0.5 |
| | | Talc | | parts by weight | 0.2 | 0.2 | 0.2 | 0.2 | 0.2 | 0.2 | 0.2 | 0.2 |
| | | Ultramarine | | parts by weight | — | — | — | — | — | 1.0 | 1.0 | — |
| | | Cyanine pigment | | parts by weight | — | — | — | — | — | 0.02 | — | 0.02 |
| First stage foamed particles | Foaming conditions | Amount of carbon dioxide | | parts by weight | 7.5 | 7.5 | 7.5 | 7.5 | 7.5 | 7.5 | 7.5 | 7.5 |
| | | Foaming temperature | | °C. | 149 | 149 | 151 | 151 | 149 | 149 | 149 | 149 |
| | | Foaming pressure (gauge pressure) | | MPa | 3.0 | 3.0 | 3.0 | 3.0 | 3.0 | 3.0 | 3.0 | 3.0 |
| | Quality | Heat of fusion ratio at high temperature | | % | 23 | 24 | 23 | 20 | 22 | 23 | 23 | 23 |
| | | Expansion ratio | | times | 20 | 20 | 20 | 20 | 20 | 20 | 20 | 20 |
| Second stage foamed particles | Foaming conditions | Inner pressure of foamed particles (absolute pressure) | | MPa | — | — | — | — | — | — | — | — |
| | | Steam pressure (gauge pressure) | | MPa | — | — | — | — | — | — | — | — |
| | Quality | Heat of fusion ratio at high temperature | | % | — | — | — | — | — | — | — | — |
| | | Expansion ratio | | times | — | — | — | — | — | — | — | — |
| In-mold foam molded article (returnable box) | Molding condition | Inner pressure of foamed particles (absolute pressure) | | MPa | 0.2 | 0.2 | 0.2 | 0.2 | 0.2 | 0.2 | 0.2 | 0.2 |
| | | Lowest heated steam pressure for molding (gauge pressure) | | MPa | 0.26 | 0.26 | 0.26 | 0.27 | 0.27 | 0.26 | 0.26 | 0.26 |
| | | Molding cycle | | seconds | 160 | 130 | 170 | 165 | 180 | 130 | 130 | 130 |
| | | Range of pressure for heat-molding | | MPa | 0.02 | 0.02 | 0.02 | 0.02 | 0.02 | 0.03 | 0.02 | 0.02 |
| | Evaluation results | Density of molded article | | g/L | 30 | 30 | 30 | 30 | 30 | 30 | 30 | 30 |
| | | Compressive strength | | MPa | 0.29 | 0.29 | 0.30 | 0.29 | 0.29 | 0.28 | 0.28 | 0.28 |
| | | Surface nature of part around grip | | — | ○ | ○ | ○ | ○ | ○ | ○ | ○ | ○ |

| | | | | | Example 9 | Example 10 | Example 11 | Example 12 | Example 13 | Example 14 |
|---|---|---|---|---|---|---|---|---|---|---|
| | Resin particles | Polypropylene random copolymer | Comonomer | Content of 1-butene | % by weight | 3.8 | 3.4 | — | — | 3.4 | 3.4 |
| | | | | Content of ethylene | % by weight | 0.5 | 1.1 | 3.7 | 3.6 | 1.1 | 1.1 |
| | | | Mz/Mn | | — | 150 | 40 | 25 | 27 | 40 | 35 |
| | | | MFR | | g/10 minutes | 10 | 9 | 8 | 7 | 9 | 8 |
| | | | Bending elastic modulus | | MPa | 1400 | 1400 | 1100 | 850 | 1400 | 1400 |
| | | | Melt strength | | cN | 0.6 | 0.1 | 0.1 | 0.1 | 0.1 | 1.6 |
| | | | Melting point Tm | | °C. | 148 | 147 | 144 | 137 | 147 | 147 |
| | | Additive | Polyethylene glycol | | parts by weight | 0.5 | 0.5 | 0.5 | 0.5 | 0.5 | 0.5 |
| | | | Talc | | parts by weight | 0.2 | 0.2 | 0.2 | 0.2 | 0.2 | 0.2 |
| | | | Ultramarine | | parts by weight | — | — | — | — | — | — |
| | | | Cyanine pigment | | parts by weight | — | — | — | — | — | — |

TABLE 1-continued

| | | | | | | | | | |
|---|---|---|---|---|---|---|---|---|---|
| First stage foamed particles | Foaming conditions | Amount of carbon dioxide | parts by weight | 7.5 | 7.0 | 7.5 | 7.5 | 7.5 | 7.5 |
| | | Foaming temperature | ° C. | 149 | 148 | 146 | 139 | 148 | 149 |
| | | Foaming pressure (gauge pressure) | MPa | 3.0 | 2.6 | 3.0 | 3.0 | 3.0 | 3.0 |
| | Quality | Heat of fusion ratio at high temperature | % | 23 | 25 | 24 | 22 | 26 | 24 |
| | | Expansion ratio | times | 20 | 13 | 20 | 23 | 15 | 17 |
| Second stage foamed particles | Foaming conditions | Inner pressure of foamed particles (absolute pressure) | MPa | — | 0.35 | — | — | — | — |
| | | Steam pressure (gauge pressure) | MPa | — | 0.08 | — | — | — | — |
| | Quality | Heat of fusion ratio at high temperature | % | — | 24 | — | — | — | — |
| | | Expansion ratio | times | — | 25 | — | — | — | — |
| In-mold foam molded article (returnable box) | Molding condition | Inner pressure of foamed particles (absolute pressure) | MPa | 0.2 | 0.2 | 0.2 | 0.2 | — | 0.2 |
| | | Lowest heated steam pressure for molding (gauge pressure) | MPa | 0.26 | 0.26 | 0.25 | 0.22 | 0.28 | 0.28 |
| | | Molding cycle | seconds | 190 | 175 | 170 | 160 | 105 | 125 |
| | | Range of pressure for heat-molding | MPa | 0.02 | 0.02 | 0.02 | 0.02 | 0.02 | 0.01 |
| | Evaluation results | Density of molded article | g/L | 30 | 24 | 30 | 26 | 40 | 40 |
| | | Compressive strength | MPa | 0.29 | 0.23 | 0.23 | 0.20 | 0.40 | 0.40 |
| | | Surface nature of part around grip | — | Δ | ◯ | Δ | Δ | ◯ | Δ |

Comparative Examples 1 to 4

Polypropylene resin particles, polypropylene resin foamed particles, and a returnable box molded article were produced and evaluated in the same manner as in Example 1, except that a polypropylene random copolymer described in Table 2 was used and the additives, foaming conditions, and in-mold foaming conditions were changed to those described in Table 2.

Comparative Example 5

After 100 parts by weight of the polypropylene random copolymer used in Example 2 and 0.10 parts by weight of t-butyl peroxy-isopropyl monocarbonate (Perbutyl I manufactured by NOF Corporation), which was a radical initiator, were mixed by stirring in a ribbon blender, the mixture was supplied to a twin-screw extruder (TEX 44 manufactured by The Japan Steel Works, Ltd.) through a metering feeder, and isoprene was supplied from a middle part of the extruder in an amount of 1.0 part by weight based on 100 parts by weight of the starting material polypropylene using a liquid-adding pump. The mixture was melt-kneaded to obtain a modified polypropylene resin.

The obtained modified polypropylene resin had an Mz/Mn of 30, an MFR of 7 g/10 minutes, a flexural modulus of 1400 MPa, a melt strength of 2.6 cN, and a melting point of 147° C.

Polypropylene resin particles, polypropylene resin foamed particles, and a returnable box molded article were produced and evaluated in the same manner as in Example 1, except that the modified polypropylene resin as above was used, and the additives, foaming conditions, and in-mold foaming conditions were changed to those described in Table 2.

Comparative Example 6

An modified polypropylene resin was obtained in the same manner as in Comparative Example 5 except that 100 parts by weight of the polypropylene random copolymer used in Comparative Example 4 and 0.02 parts by weight of t-butyl peroxy-isopropyl monocarbonate (Perbutyl I manufactured by NOF Corporation), which was a radical initiator, were used.

The obtained modified polypropylene resin had an Mz/Mn of 17, an MFR of 6 g/10 minutes, a flexural modulus of 1100 MPa, a melt strength of 1.6 cN, and a melting point of 144° C.

Polypropylene resin particles, polypropylene resin foamed particles, and a returnable box molded article were produced and evaluated in the same manner as in Example 1, except that the modified polypropylene resin as above was used, and the additives, foaming conditions, and in-mold foaming conditions were changed to those described in Table 2.

Comparative Example 7

Molding was performed and evaluations were made in the same manner as in Comparative Example 4, except that the in-mold foam molding was performed in a manner in which the first stage foamed particles whose inner pressure was the same as the atmospheric pressure, without providing an inner pressure thereto, were filled in the mold in [Production of In-Mold Foam Molded Article].

Evaluation results in Comparative Examples 1 to 7 are shown in Table 2.

TABLE 2

| | | | | Comparative Example | | | | | | |
|---|---|---|---|---|---|---|---|---|---|---|
| | | | | 1 | 2 | 3 | 4 | 5 | 6 | 7 |
| Resin particles | Poly-propylene copolymer | Comonomer | Content of 1-butene % by weight | 3.7 | 3.5 | 1.7 | 1.7 | 3.4 | 1.7 | 1.7 |
| | | | Content of ethylene % by weight | 0.6 | 2.2 | 2.5 | 2.5 | 1.1 | 2.5 | 2.5 |
| | | Mz/Mn | — | 18 | 310 | 19 | 19 | 30 | 17 | 19 |
| | | MFR | g/10 minutes | 14 | 15 | 4 | 7 | 7 | 6 | 7 |
| | | Bending elastic modulus | MPa | 1450 | 1350 | 1100 | 1100 | 1400 | 1100 | 1100 |
| | | Melt strength | cN | 0.1 | 0.6 | 0.1 | 0.1 | 2.6 | 1.6 | 0.1 |
| | | Melting point Tm | °C. | 147 | 146 | 144 | 144 | 147 | 144 | 144 |
| | Additive | Polyethylene glycol | parts by weight | 0.5 | 0.5 | 0.5 | 0.5 | 0.5 | 0.5 | 0.5 |
| | | Talc | parts by weight | 0.2 | 0.2 | 0.2 | 0.2 | 0.2 | 0.2 | 0.2 |
| | | Ultramarine | parts by weight | — | — | — | — | — | — | — |
| | | Cyanine pigment | parts by weight | — | — | — | — | — | — | — |
| First stage foamed particles | Foaming conditions | Amount of carbon dioxide | parts by weight | 7.5 | 7.5 | 7.5 | 7.5 | 7.5 | 7.5 | 7.5 |
| | | Foaming temperature | °C. | 148 | 147 | 146 | 146 | 149 | 146 | 146 |
| | | Foaming pressure (gauge pressure) | MPa | 3.0 | 3.0 | 3.0 | 3.0 | 3.0 | 3.0 | 3.0 |
| | Quality | Heat of fusion ratio at high temperature | % | 24 | 23 | 23 | 24 | 24 | 24 | 24 |
| | | Expansion ratio | times | 20 | 20 | 20 | 16 | 12 | 17 | 16 |
| Second stage foamed particles | Foaming conditions | Inner pressure of foamed particles (absolute pressure) | MPa | — | — | — | — | — | — | — |
| | | Steam pressure (gauge pressure) | MPa | — | — | — | — | — | — | — |
| | Quality | Heat of fusion ratio at high temperature | % | — | — | — | — | — | — | — |
| | | Expansion ratio | times | — | — | — | — | — | — | — |
| In-mold foam molded article (returnable box) | Molding condition | Inner pressure of foamed particles (absolute pressure) | MPa | 0.2 | 0.2 | 0.2 | 0.2 | 0.2 | 0.2 | — |
| | | Lowest heated steam pressure for molding (gauge pressure) | MPa | 0.26 | 0.26 | 0.25 | 0.25 | 0.30 | 0.25 | A molded article had many wrinkles and large shrinkage and a molded article having a beautiful surface could not be obtained. |
| | | Molding cycle | seconds | 200 | 220 | 230 | 250 | 120 | 125 | |
| | | Range of pressure for heat-molding | MPa | 0.02 | 0.02 | 0.02 | 0.02 | 0 (Molding could be performed only at 0.30 MPa.) | 0.01 | |
| | Evaluation results | Density of molded article | g/L | 30 | 30 | 30 | 38 | 50 | 40 | 40 (a molding pressure of 0.26 MPa) |
| | | Compressive strength | MPa | 0.29 | 0.28 | 0.23 | 0.29 | 0.48 | 0.40 | No measurement |
| | | Surface nature of part around grip | — | Δ | x | x | x | x | x | x |

REFERENCE SIGNS LIST 1A and 1B Returnable box
2, 2A, and 2B Side wall
3 Bottom wall
4 Partition
5 Grip
10 Mold
11A Fixed die
11a A part in which a grip is formed
11B Movable die
12A and 12B Steam valve
13A and 13B Drain valve
14A and 14B Mold chamber
15A and 15B Nozzle of supplying cooling water
16 Filling machine
$t_{2A}$ and $t_{2B}$ Thickness of a side wall
$t_3$ Thickness of a bottom wall X A part at which the mold thickness is thick
Y A mold part which is not brought into contact with a chamber
Z A part in which the surface properties are easily deteriorated (surface around the grip)

The invention claimed is:

1. Polypropylene resin foamed particles comprising, as a base material resin, a polypropylene random copolymer, wherein the polypropylene random copolymer has a ratio of a Z-average molecular weight Mz to a number average molecular weight Mn, Mz/Mn, of 20 or more and 300 or less; a melt-flow rate of 5 g/10 minutes or more and 20 g/10 minutes or less; a melt strength of 2.5 cN or less; and a flexural modulus of 600 MPa or more and 1600 MPa or less.

2. The polypropylene resin foamed particles according to claim 1, wherein the polypropylene random copolymer has an Mz/Mn of 20 or more and 140 or less.

3. The polypropylene resin foamed particles according to claim 1, wherein the polypropylene random copolymer has an Mz/Mn of 23 or more and 60 or less.

4. The polypropylene resin foamed particles according claim 1, wherein the polypropylene random copolymer has a melt strength of 1.5 cN or less.

5. The polypropylene resin foamed particles according claim 1, wherein the polypropylene random copolymer has a flexural modulus of 1300 MPa or more and 1600 MPa or less.

6. The polypropylene resin foamed particles according claim 1, wherein the polypropylene random copolymer is a propylene/1-butene random copolymer and/or a propylene/ethylene/1-butene random copolymer.

7. The polypropylene resin foamed particles according to claim 1, wherein the polypropylene random copolymer has a melting point of 130° C. or higher and 158° C. or lower.

8. The polypropylene resin foamed particles according to claim 1, which has at least two heat quantity areas of fusion in a measurement according to a differential scanning calorimeter method.

9. The polypropylene resin foamed particles according to claim 8, which has two heat quantity areas of fusion in a measurement according to the differential scanning calorimeter method, and a ratio of a heat quantity of fusion at a high temperature side Qh calculated from a heat quantity of fusion at a low temperature side Ql and a heat quantity of fusion at a high temperature side Qh, [Qh/(Ql+Qh)]×100 (%), of 10% or more and 50% or less.

10. The polypropylene resin foamed particles according to claim 1, which contains at least two pigments selected from the group consisting of ultramarine, cyanine pigments, azo pigments, and quinacridone pigments in a content of 0.01% by weight or more and 1.5% by weight or less in 100% by weight of the polypropylene resin foamed particles.

11. A method for producing polypropylene resin foamed particles comprising the steps of: housing polypropylene resin particles containing a polypropylene random copolymer which has a ratio of a Z-average molecular weight Mz to a number average molecular weight Mn, Mz/Mn, of 20 or more and 300 or less, a melt-flow rate of 5 g/10 minutes or more and 20 g/10 minutes or less, a melt strength of 2.5 cN or less, and a bending elastic modulus of 600 MPa or more and 1600 MPa or less in a pressure-resistant container together with water and a foaming agent; increasing a temperature and a pressure while the polypropylene resin particles are dispersed in a stirring condition; and then releasing a solution in which the polypropylene resin particles are dispersed in the pressure-resistant container into a zone having a pressure lower than the inner pressure of the pressure-resistant container to foam the polypropylene resin particles.

12. The method for producing polypropylene resin foamed particles according to claim 11, wherein a temperature in the pressure-resistant container at the foaming is adjusted to not less than Tm-10(° C.) more than Tf(° C.), wherein Tm is a melting point of the polypropylene random copolymer, and Tf is a fusion end temperature of the polypropylene random copolymer.

13. A method for producing polypropylene resin foamed particles comprising the steps of: providing an inner pressure into first stage foamed particles, the first stage foamed particles being the polypropylene resin foamed particles produced by the method according to claim 11, by impregnating the particles with an inorganic gas; and then bringing the particles into contact with steam whose pressure is adjusted to 0.04 MPa (gauge pressure) or more and 0.25 MPa (gauge pressure) or less, thereby obtaining polypropylene resin foamed particles having an expansion ratio higher than that of the first stage foamed particles.

14. An in-mold foam molded article containing the polypropylene resin foamed particles according to claim 1.

15. The in-mold foam molded article according to claim 14, which is a returnable box.

16. The in-mold foam molded article according to claim 15, which is provided with a grip which can be grasped by inserting workers' fingers on a side wall part of the returnable box.

17. A method for producing an in-mold foam molded article containing the steps of: filling the polypropylene resin foamed particles according to claim 1 in a mold; and then heating them, thereby performing in-mold foam molding.

18. The method for producing an in-mold foam molded article according to claim 17, wherein the polypropylene resin foamed particles are filled in the mold in a state in which the inner pressure thereof is the atmospheric pressure without increasing the inner pressure, and in a state that in which not compressed them with a gas, and then they are heated, thereby performing the in-mold foam molding.

19. The method for producing an in-mold foam molded article according to claim 17, wherein the in-mold foam molded article is a returnable box.

20. The method for producing an in-mold foam molded article according to claim 19, wherein the returnable box is provided with a grip which can be grasped by inserting workers' fingers on a side wall part thereof.

* * * * *